(12) United States Patent
Clapp et al.

(10) Patent No.: US 8,956,548 B2
(45) Date of Patent: Feb. 17, 2015

(54) LIQUID CRYSTAL FORMULATIONS AND STRUCTURES FOR SMECTIC A OPTICAL DEVICES

(75) Inventors: Terry Victor Clapp, Bishop's Stortford (GB); William Alden Crossland, Harlow (GB); Anthony Bernard Davey, Cambridge (GB); Martin Grasmann, Midland, MI (US); Jonathan Paul Hannington, Midland, MI (US); Russell Keith King, Midland, MI (US); Mikhael Pivnenko, Cambridge (GB); Steven Robson, Vale of Glamorgan (GB); Huan Xu, Cambridge (GB)

(73) Assignees: Dow Corning Corporation, Midland, MI (US); Cambridge Enterprise Limited, Cambridge (GB)

( * ) Notice: Subject to any disclaimer, the term of this patent is extended or adjusted under 35 U.S.C. 154(b) by 142 days.

(21) Appl. No.: 13/635,334

(22) PCT Filed: Mar. 15, 2011

(86) PCT No.: PCT/US2011/028495
§ 371 (c)(1),
(2), (4) Date: Nov. 30, 2012

(87) PCT Pub. No.: WO2011/115976
PCT Pub. Date: Sep. 22, 2011

(65) Prior Publication Data
US 2013/0155340 A1 Jun. 20, 2013

Related U.S. Application Data

(63) Continuation-in-part of application No. PCT/US2010/027328, filed on Mar. 15, 2010.

(60) Provisional application No. 61/314,039, filed on Mar. 15, 2010.

(51) Int. Cl.
| | | |
|---|---|---|
| C09K 19/04 | (2006.01) | |
| C09K 19/38 | (2006.01) | |
| C09K 19/54 | (2006.01) | |
| C09K 19/58 | (2006.01) | |
| C09K 19/60 | (2006.01) | |
| G02F 1/137 | (2006.01) | |
| C09K 19/40 | (2006.01) | |
| C09K 19/42 | (2006.01) | |
| C09K 19/52 | (2006.01) | |

(52) U.S. Cl.
CPC .............. *C09K 19/60* (2013.01); *C09K 19/406* (2013.01); *C09K 19/408* (2013.01); *C09K 19/42* (2013.01); *C09K 19/52* (2013.01); *C09K 19/54* (2013.01); *C09K 19/58* (2013.01); *G02F 1/13781* (2013.01); *C09K 2019/0444* (2013.01)
USPC ............... 252/299.01; 252/299.1; 252/299.2; 252/299.5; 252/299.6; 349/183; 349/184

(58) Field of Classification Search
CPC .... C09K 19/406; C09K 19/408; C09K 19/42; C09K 19/52; C09K 19/54; C09K 19/58; C09K 19/60; C09K 19/2804; C09K 19/3833; G02F 1/13781
USPC ................. 252/299.01, 299.2, 299.5, 299.66, 252/299.1, 299.6; 349/183, 184
See application file for complete search history.

(56) References Cited

U.S. PATENT DOCUMENTS

| | | |
|---|---|---|
| 4,139,273 A | 2/1979 | Crossland et al. |
| 4,291,948 A | 9/1981 | Crossland et al. |
| 4,419,664 A | 12/1983 | Crossland et al. |
| 4,703,305 A | 10/1987 | Ayliffe |
| 5,455,697 A | 10/1995 | Coles et al. |
| 5,547,604 A | 8/1996 | Coles et al. |
| 8,357,312 B2 | 1/2013 | Sun |
| 2006/0091358 A1 | 5/2006 | Netland et al. |
| 2011/0080553 A1* | 4/2011 | Sun ............................... 349/184 |
| 2013/0155340 A1 | 6/2013 | Clapp et al. |

FOREIGN PATENT DOCUMENTS

| EP | 0529597 A1 | 3/1993 |
|---|---|---|
| EP | 1537190 B1 | 11/2007 |
| WO | WO 2004022670 A1 | 3/2004 |
| WO | WO 2006003171 A1 | 1/2006 |
| WO | WO 2006/035213 A2 | 4/2006 |
| WO | WO 2009/111919 A1 | 9/2009 |
| WO | WO 2010070606 A1 | 6/2010 |
| WO | WO 2011115976 A1 | 9/2011 |

OTHER PUBLICATIONS

Article entitled "A Variable Tilt Smectic A Electro-Optic Effect Giving Stored Colours" by D. Coates et al. Mol. Cryst. vol. 41 (Letters), pp. 151-154 (1978).
Article entitled "The Influence of Lithium Perchlorate on Discotic Liquid Crystals and the Ion Conduction of Their Mixtures" by L. Brunsveld et al. Mol. Cryst. Liq. Cryst., 1999, vol. 331, pp. 449-456.
Article entitled "Investigations on Liquid Crystalline Polysiloxanes, 1 Synthesis and Characterization of Linear Polymers" by Heino Finkelmann et al. Makromol. Chem., Rapid Commun. 1, 31-34 (1980).
Article entitled "Preparation of Liquid Crystalline Polysiloxanes With Terminal Cyano Groups in the Side Chains" by George. W. Gray et al. Makromol. Chem., Rapid Commun. 7, 71-76 (1986).
English language abstract for WO 2009/111919 extracted from the espacenet.com database on Apr. 23, 2013, 30 pages.
International Search Report for Application No. PCT/US2011/028495 dated Aug. 26, 2011, 4 pages.
D. Coates et al., "Dielectric and Conductivity Studies of Smectic A Materials Towards Improved Dynamic Scattering Display Characteristics," pp. 96-99, Proceedings of Eurodisplay, 1987.
D. Coates et al., "Electrically induced scattering textures in smectic A phases and their electrical reversal," J. Phys. D: Appl. Phys., vol. 11, 1978, pp. 2025-2034.
Newton et al., "Synthesis and Properties of Low-molar-mass Liquid-crystalline Siloxane Derivatives," J. Mater. Chem., 1994, 4(6), pp. 869-874.
Gardiner et al., "Enhancing lifetime in a bistable smectic A liquid crystal device," J. Phys. D: Appl. Phys. 40 (2007) pp. 977-981.
W.A. Crossland: "An Electrically Addressed Smectic Storage Device," SID 85 Digest, pp. 124-127, 1985.
Dias et al., "Ionic conduction of lithium and magnesium salts within laminar arrays in a smectic liquid-crystal polymer electrolyte," J. Chem. Soc., Faraday Trans., 1996, 92(14), pp. 2599-2606.
J.A. Geurst et al., "Theory of Electrically Induced Hydrodynamic Instabilities in Smectic Liquid Crystals," Physics Letters, vol. 41, No. 4, Oct. 9, 1972, pp. 369-370.
Casten Tschierske, "Non-conventional liquid crystals—the importance of micro-segregation for self-organisation," J. Mater. Chem., 1998, 8(7), pp. 1485-1508.
Blinov et al., "Electro-Optic Effects in Liquid Crystal Materials"; Springer Verlag, pp. 358-359, 1994.
Canter, S., et al., "Electrically Addressed Smectic Storage Device for Large Flat Panel Displays", Electrical Communication, 60(1): 87-93, 1986.
Chmielewski, A.G., et al., "Reological Properties of Some Biphenyl Liquid Crystals", Rheologica Acta, 23: 207-210, 1984.
Coates, D., et al., "Electrically Induced Scattering Textures in Smectic A Phases and Their Electrical Reversal", Ann. Phys., vol. 3, No. 2-4, p. 325, 1978.
Crossland, W.A., et al., "An Electrically Addressed Smectic Storage Device", SID 85 Digest, 124-127, 1985.
Crossland, W.A., et al., "An Evaluation of Smectic Dynamic Scattering for High Complexity Displays With On-Screen Memory", Proc. SID, 23(1): 9-13, 1982.
Crossland, W.A., et al., "Large Flat Panel Displays Using Smectic Memory LCDs", Electrical Engineering, pp. 35-41, Aug 1985.
Davey, A.B., et al., "Dyed Smectic a Liquid Crystals for Colour Reflective Displays", Proc. Latindisplay 2007, pp. 107-111, Nov. 2007.
De Gennes, P.G., "The Physics of Liquid Crystals", SMECTICS, pp. 288-301, 1974.

\* cited by examiner

*Primary Examiner* — Shean C Wu
(74) *Attorney, Agent, or Firm* — Howard & Howard Attorneys PLLC

(57) ABSTRACT

The present, invention relates to liquid crystal compositions having a smectic A structure for use in an optical device in which the composition is sandwiched between a pair of electrodes (12-15). In essence the composition includes a siloxane oligomer (component (a)) which may be seen to construct a layered SmA system of particular spacing and "strength". Within this structure a low molar mass nematic mesogen (component (c)) is provided that may be considered to be that of a "plasticiser" which moderates the layer "strength", while simultaneously providing tuneability to the properties of the composition, e.g. its refractive index or dielectric anisotropy. The addition of a side chain liquid crystal polysiloxane (component (d)) allows such systems to be further moderated since they can be considered as binding together the la>¾rs, both within a given layer and between layers. An ionic dopant (component (b)) is also included in the composition that migrates through the composition when low frequency electric fields are applied to the composition by the electrodes, thereby disrupting the order to the composition. Order in the composition can be restored by applying a higher frequency field that does not allow the dopant time to migrate significantly. Chromophores may also be included in the formulation.

32 Claims, 17 Drawing Sheets

LIQUID CRYSTAL FORMULATIONS AND STRUCTURES FOR SMECTIC A OPTICAL DEVICES

RELATED APPLICATIONS

This application is the National Stage of International Patent Application No. PCT/US 2011/028495, filed on Mar. 15, 2011, which claims priority to and all the advantages of U.S. Provisional Patent Application No. 61/314,039, filed on Mar. 15, 2010, and International Patent Application No. PCT/US2010/027328, filed on Mar. 15, 2010.

TECHNICAL FIELD

The present invention relates to liquid crystal compositions having a smectic A structure, cells containing such a composition sandwiched between a pair of electrodes, an optical device containing multiple cells and a method of switching the optical properties of the composition by applying an electric field thereto.

BACKGROUND TO THE INVENTION

In the phases of matter normally considered by the lay person there are a series of material characteristics typified, in a cooling sequence, by a gas phase, a liquid phase and a solid phase. For materials such as simple organic liquids (e.g. methanol, hexane etceteras) this is normally sufficient. However, as the molecular constituents become longer, more rigid or more complex, these phase sequences are liable to become more complex. In the very large molecules, comprising many tens or many hundreds of thousands of units, the most familiar behaviours are those of polymers which may show no gas phase (because the molecules decompose below any temperature where the systems can "evaporate") but may have several properties upon cooling through a solid-like state, for example a rubber, a glass and a crystal, in sequence. For slightly smaller molecules the situation may be even more complex; herein we may find a gas phase, a first liquid phase (which is typically isotropic), a second liquid phase (which is light scattering) and possibly several, distinct, further "liquid-like" states prior to freezing, as a solid, which may be crystalline or not. These more complex liquid states are very often indicative of liquid crystalline behaviour. As the phrase (or designation) suggests, these liquids have molecules which have a propensity to self order without freezing and thus gain crystalline attributes even though they still flow and may fill a container.

The phases of liquid crystals are many and complex but may be readily (albeit broadly and non-comprehensively) described as a generalised sequence of states that such a molecular fluid may pass through on the way from being an isotropic liquid until it freezes as a solid. In general such molecules will be typified by strong anisotropy. The form that this anisotropy takes may be complex, but for the present purposes, cases can be considered where the molecule is typified by a high aspect ratio (much longer than wide, thus "rod" or "lathe" like), and may have dipole character, and anisotropic polarisability. In these cases the average direction of molecular orientation is referred to as the "director". Very often such properties of anisotropy are well aligned with each other, but significant cases exist where the forms of anisotropy of a molecule do not have the same principle axes within a Cartesian coordinate system. Such molecules are of profound significance in a very large class of materials of biological and physical scientific interest.

Nematic liquid crystals typify the commonest liquid crystalline materials and are commonly used in liquid crystal flat screen devices and flat-panel displays. They are typically fairly short (bi-phenyl) aromatic cores with a charge transfer character (in the extreme), a strong electron donor and acceptor group serving to enhance polarisability, and with modest head or tail extensions which enhance their mesogenic character (molecular aspect ratio, internal heterogeneous character). Such nematic materials typically display a uniaxial order whereby they have an anisotropy displayed along a certain axis and the plane normal to this axis has little or no anisotropy. However, the nematics are still relatively fluid and if they have strong dipolar and polarisable character they may be aligned with an electric field (or magnetic field) dielectric re-orientation axis. This is the principle behind many of their most valued applications. They may also be ordered by alignment agents, physical flow and other mechanical processes, and, in various applications, these processes are very often used to set a pre-determined initial condition or a state to which they will return after perturbation. Generally, in the absence of strong alignment agents, or a situation wherein the nematic is constrained in an anisotropic field, then upon removal of an imposed field the nematic liquid crystals will relax to poly-domains that are locally anisotropic, and thus appear optically "light scattering".

Extending the length of nematic mesogens, or other structural changes, very often causes them to show further phases upon cooling below the nematic phase, and before solidification, and at lower temperatures the typical character may be of a "layered fluid". X-ray and other studies show that a weak density wave, characteristic of well defined layer spacing, develops, and the materials are distinct from the nematic phases both via microscopy and in visco-elastic and other character. These layered liquid crystals are called "smectic" liquid crystals. Herein we will only consider the materials normally referred to as "Smectic type A", or just "smectic A", abbreviated to "SmA", liquid crystals. For example the prototypical "5CB" (4'-pentyl-4-biphenylcarbonitrile), "5OCB" (is the ether linked pentyl, 4'-(pentyloxy)-4-biphenylcarbonitrile), is nematic, the "8CB" (4'-octyl-4-biphenylcarbonitrile) and "8OCB" (4'-(octyloxy)-4-biphenylcarbonitrile), each exhibit a SmA phase beneath the higher temperature nematic phase.

The following convention is used within this specification for the abbreviation "mCB" and "mOCB" where m stands for an integer and refers to the number of carbon atoms in the alkyl or alkoxyl chain in 4-cyano-4'-n-alkylbiphenyl and 4-cyano-4'-n-alkoxybiphenyl, respectively; for example:

8CB=4-cyano-4'-octylbiphenyl; and
8OCB=4-cyano-4'-octyloxybiphenyl

Other abbreviations used in the specification are set out in the Tables at the end of the specification.

The molecules forming SmA phases have similar properties to those forming nematic phases. They are rod-like and usually have a positive dielectric anisotropy. The introduction of a strong transverse dipole in order to induce a negative dielectric anisotropy tends to destabilise the SmA phase and may lead to increased chemical instability.

One particular character of smectic liquid crystals is a marked hysteresis in their switching to the extent that dielectric re-orientation (or other disturbances of the smectic structure) do not relax when the electric field is removed e.g. sec Crossland et al ref. P4 and ref 6), i.e. unlike most nematic liquid crystal structures, dielectrically re-oriented SmA liquid crystals remain in the driven state until further forces are applied. This is explained via reference to the nature of the processes which are used to drive such liquid crystals. A brief description of the nature of the order in such liquid crystals is provided here to clarify the discussion below. By definition, SmA liquid crystal compositions form a layered structure. In a body of SmA material, the layers of the liquid crystals in the different regions of the body may be more ordered with respect to each other or less ordered. (i.e. more disordered) As used herein the terms "ordered" and "disordered" refer to the alignment of the layers within a body of SmA liquid crystal composition. In an extreme case of a disordered state, the composition is broken up into fragments (or domains) and the orientation of the layers within each fragment is not influenced by its surroundings, including the orientation of the layers in neighboring fragments. However, that is an ideal situation and in practice, the liquid crystal system will have constraints upon it, such as the juxtaposition of walls containing the composition, especially field electrodes, and these will cause some deviation from a truly random (stochastic) alignment of the layers in the fragments of the layered phase. Similarly there will be some residual alignment of the layer orientation after the composition has been disturbed: such a distribution is often parameterised by reference to mathematical definitions of "order parameter" (e.g. see reference 15). In other words, even in an extreme case of disorder, the orientation of the layers in the different fragments will not be completely random; such a state of affairs is often referred to as "pseudo-random".

As a field is applied to the composition, the nature of these layer distributions will tend to change and the layers in the various fragments will statistically become more aligned with the electrodes and with each other, i.e. more ordered, and this ordering will asymptotically approach to a mono-domain in which all the layers in the composition are perfectly ordered, i.e. aligned with each other, and so the fragments become a single domain. However, such a perfectly aligned system is generally also an idealized state.

There will be intermediate states of alignment at which there would be a definable order parameter intermediate between the starting (disordered) condition and the (ordered) end condition (in the case of going from disorder to order this parameter would be increasing). The end condition itself would approach a defined value of the order parameter, which is often expressed as a normalised value between 0.0 (no order) and 1.0 (fully mutually aligned). In the latter case we would have approached a perfect mono-domain of completely correlated alignment of the layered states.

A thin glass cell may be formed by taking planar sheets, generally of glass (similar to small microscope slides), and applying to these a transparent conducting layer, typically made of indium tin oxide. These two sheets may be formed into a thin cell for example separated by beads of uniform diameter (typically, say, 5-15 micrometers, dependent on desired cell thickness). This cell is normally edge sealed with glue allowing apertures for filling (only one for small cells vacuum filled, but two or more in flow or pumped filling systems) with the liquid crystal. Such simple glass cells are very often used for liquid crystal characterisation and are similar in form to the much larger glass panels used in display devices (for nematic liquid crystals, these generally have much thinner cell-gaps). Using such a cell a SmA liquid crystal layer may be formed by filling the cell (typically at an elevated temperature above the isotropic transition for the material). In the SmA devices discussed here, no alignment layers need be used in such materials, in strong contrast to nematic display-type devices where uniform alignment of the cell is a requisite of their operation. On filling and thermally cycling such a thin SmA cell from room temperature to above the isotropic transition and back again, the liquid crystal will exhibit textures that are typical for the phases. Whilst the nematic, with no surface alignment, may appear in the well-known Schlieren texture where line defects or 'threads' scatter light, in the SmA a 'focal conic' texture is formed as a consequence of the layered structure of the SmA material. There is a sharp spatial variation in the refractive index which can result in light scattering (photo-micro-graphs of the liquid crystal textures are shown in FIGS. 2 to 5). The appearance of these textures is a consequence of the anisotropy of the refractive index, which is highest when light is travelling orthogonal to the more polarisable axis of the average molecular direction. The variation in refractive index causes light scattering. When viewed (under a microscope) between crossed polarisers, contrast can also be observed between regions of different molecular orientations.

In such cells SmA materials may have their electro-optic responses measured. The application of wires to contact the conducting glass coating allows the field across the liquid crystal layer to be established and modulated.

To electrically address a SmA liquid crystal an alternating (AC) field is normally applied. For non-doped materials with no ionic contamination or additives, the dielectric anisotropy of the LC will cause the re-arrangement, of the initially randomly aligned poly-domains, to align the mesogen with the field direction (normal to the glass surface). Under such a condition, the cell (viewed in transmission or normal to its surface), will appear clear. In this condition the average orientation of the anisotropic molecules is normal to the glass layer. We can say the SmA layer is now in a mono-domain, that is oriented with layers parallel to the glass plates. For most SmA materials this situation is only reversible by re-heating the cell to destroy the SmA alignment.

Most SmA materials have a positive dielectric anisotropy, i.e. the average direction of the long axis of the molecules will align with an electric field. A film of smectic A liquid crystal aligned in this manner between glass plates has the average orientation of the long molecular axis (called the 'director') aligned orthogonal to the glass plates. This orientation is referred to as 'homeotropic alignment'.

This dielectric re-orientation of smectic A liquid crystals, with positive dielectric anisotropy, cannot alone form the basis of a practical electro-optic phenomenon for use in display devices because it can only be reversed by heating and subsequent cooling. A smectic crystal film between glass plates, as described above, that has been uniformly dielectrically re-oriented, appears clear and transparent or as an oriented waveplate when viewed in polarised light (i.e. if the cell is viewed between sheets of linear polarising film). Two methods of generating optical contrast relative to this state have been demonstrated: Contrast can be generated by using another electric field to re-orient the waveplate. The change is visible if this is viewed between sheets of linear polarising film. Alternatively light scattering can be electrically induced in the layer by disrupting the mono-domain. This is visible without polarised light.

It is possible to employ liquid crystals with a negative dielectric anisotropy at low frequencies and a positive dielectric anisotropy at higher frequencies (so-called two frequency materials) as described by Crossland et al 1978 (refs 6 and P4) and in this instance, it is possible to reversibly switch such a waveplate using dielectric re-orientation. However the molecular structures required, inducing negative dielectric anisotropy at low frequency, usually conflict with the requirements for stable SmA phases and reduces significantly the value of the positive dielectric anisotropy at higher frequencies (so both re-orientations require relatively high drive voltages and are relatively slow).

Here we are concerned with the better prospect of reversibly switching between a homeotropically aligned clear transparent state and a disordered light scattering state created by smectic dynamic scattering (SDS):

If a suitable ionic dopant is dissolved in the smectic A liquid crystal host, then under the influence of DC or low frequency (e.g. <500 Hz) electric fields, two orthogonal forces attempt to orient the smectic A director. Dielectric re-orientation as described above attempts to align the smectic A director (indicating the average direction of the long molecular axis) in the field direction. Simultaneously, the movement of ions through the smectic A electrolyte attempts to align the smectic A director in the direction in which ions find it easier to travel. In smectic A materials this is within the layers i.e. orthogonal to the field direction (i.e. the materials have a positive dielectric anisotropy and a negative conductivity anisotropy). The two competing forces give rise to an electro-hydrodynamic instability in the liquid crystal fluid that is referred to as 'dynamic scattering'. (It is analogous to the similar process in nematic liquid crystals where the conductivity anisotropy is positive, so it only occurs in nematic liquid crystals with a negative dielectric anisotropy.) In smectic A materials the dynamic scattering state strongly scatters light and (in contrast to the similar state in nematic materials) the disruption of the smectic A structure that it produces remains after the electrical pulse causing it has terminated. The reversibility between the clear, uniformly oriented, state and the ion-transit induced, poly-domain, scattering state, depends upon the different frequency domains in which these processes operate. Dynamic scattering requires the field driven passage of ions through the liquid crystal fluid. It therefore occurs only with DC or low frequency AC drive. Higher frequencies cause dielectric re-orientation (the ions cannot "move" at these frequencies) thus re-establishing a uniform orientation of the molecules.

Thus the combination of dielectric re-orientation (into a clear transparent state) and dynamic scattering (into a strongly light scattering state) in a suitably doped SmA phase (possessing a positive dielectric anisotropy and a negative conductivity anisotropy) can form the basis of an electrically addressed display and is used in the present invention. High frequencies (variable, typically >1000 Hz) drive the SmA layer into an optically clear state and low frequencies (variable, typically <500 Hz) drive it into the light scattering state. A key feature of such a display is that both these optical states are set up using short electrical pulses, and both persist indefinitely, or until they are re-addressed electrically. This is not true of the related phenomena in nematic liquid crystals. It is this property of electro-optic bistability (or more accurately multi-stability) that allows SmA dynamic scattering displays to be matrix addressed without pixel circuitry and which results in their extremely low power consumption in page-oriented displays or in smart windows.

The phenomenon of dynamic scattering in SmA liquid crystals was predicted by Geurst and Goosens in 1972 (ref 8). It was first observed and identified by Crossland et al 1976 (ref P1) who proposed displays based on this phenomena and dielectric re-orientation and described their structure and electrical addressing (refs. P1, P2, P3, 1, 2 and 3). Subsequently highly multiplexed passive matrix displays were demonstrated with good viewing characteristics based on efficient switching between clear and scattering states (refs 4). Such displays are generally viewed against a black background and could be illuminated (e.g. with a front plastic light guide) or used without illumination as reflective displays. They were also used as efficient projection displays because the clear areas are highly transparent (no polarising films) and the scattering textures efficiently scatter light out of the aperture of projection lenses.

A second method of generating contrast using the electro-optic effects was also disclosed in P1 (Crossland et al 1976): if a suitable dichroic dye is dissolved in the SmA then the dye orientation is randomised in the scattering state, which therefore appears coloured. The clear state however orients the dye orthogonal to the liquid crystal layer so its absorption band is not apparent. This 'guest-host' effect (where the dye is the guest in the SmA host) switches between the dye colour and white when viewed against a white background. Displays were fabricated using dyes of various colours (including mixtures of dichroic dyes to give black) and devices employing, for example, anthraquinone based dyes exhibited good contrast and photochemical stability. Such dye can also be used in the present invention.

This invention relates to displays as described in which a disordered state is produced by the process of SmA dynamic scattering and a clear, uniform state is induced by dielectric re-orientation. Here they are referred to as smectic A dynamic scattering (SDS) displays. These two states are equally stable allowing arrays of pixels of any size to be addressed line-at-a-time without the use of pixel circuitry. Such line-at-a-time display drivers are well known.

Their nature has not heretofore been attractive for mainstream video display development where nematic liquid crystals have largely been favoured. However, with emergent requirements for electronic display systems of superior energy efficiency the SmA materials offer several significant intrinsic advantages. In particular SmA materials are very attractive for information displays where video performance is not requisite and high energy efficiency, and quite possibly unlit operation, is desired (reflective display systems).

A typical example is provided by the consideration of metropolitan information systems (e.g. displays of road-traffic information, public transport timetables, visitor information etceteras). Such will need to operate in a quasi continuous up-date mode, with some sites requiring full exposure to sunlight, others being sited where frequent maintenance is difficult. Such applications will thus require refresh rates that are reasonable and provide a readable experience (for comparison, consider the experience of reading and turning a page of a book or magazine). Similarly with continuously refreshed, paged, data, the expectation for acceptable lifetime must suggest that the screen can be refreshed many times, say, for a service life of 3 to 5 years (if we assume pages will be refreshed every 10 seconds then this would imply that the display must operate between 10 and 15 Million refresh cycles). Naturally this operation scenario is not the only consideration, but it does provide a useful guideline for the fabrication of practical devices.

The use of SmA SDS in reflective, and front and/or back-lit, display systems goes back to the 1970s and 1980s when early trials of SmA materials in a scattering display mode were evaluated for point-of-sale display, information systems, electronic books and electronic displays for overhead projectors (see Crossland et al ref 4). The choice between using dyed or un-dyed systems has historically been dependent upon application specifications.

For simple monochrome applications the use of dyed or un-dyed systems is viable, in the latter case a printed back-drop may be used to present a colour when the material is cleared. In both cases the scattering texture is critical to the visual quality of the display. For the dyed cases the contrast is between the (normally) white of the back-drop and the achieved extinction of the light from the dyed scattering texture. In the un-dyed system the contrast perceived is through the achieved background scattering 'brightness' (of the native scattering texture) and the contrast between that and the revealed back-drop. In both of these cases the texture which develops in the scattering state and the ability to clear that state back to 'transparency' are critical application parameters. Light scattering depends upon both the refractive index anisotropy of the material and the scale of the micro-structure developed in the scattering state. In liquid crystals these are related through several equations which tie dielectric anisotropy and other parameters together with field driven character.

The background on SmA liquid crystals as a phase of matter is widely covered in the liquid crystal literature (e.g. in the books ref 9).

The possibility of dynamic scattering on SmA phases was postulated by Geurst and Goosens 1972 (ref 8). It was first observed by Crossland, Needham and Morrissy (1976 ref P1 and subsequent references).

From the fundamental studies and theoretical development we may expect, simplistically, that field induced structural inhomogeneity will arise with scales set by, $$w \propto K^{1/2}/E, \qquad \text{Equation 1}$$

Where, w is a characteristic length scale (domain size), K is the effective elastic modulus and E is the applied field.

The time over which such inhomogeneity may emerge is related to, $$\tau \propto \eta/E, \qquad \text{Equation 2}$$

Where, τ is the time, η is the effective viscosity and E is field.

Dynamic scattering relies on the competing forces of 'flow alignment' due to the passage of ions and dielectric re-orientation attempting to align the liquid crystal director in orthogonal directions. The voltage required to cause scattering scales with a relationship derived by Geurst and Goosens. In their paper they relate the threshold voltage V, to the ratio of the product of the effective elastic tensor component, K, (for smectic A liquid crystals this is the splay component, K11) and the cell thickness; divided by the product of the dielectric modulus (reduced by a factor related to the conductivity anisotropy) multiplied by the characteristic length, λ, of the smectic layer, thus, $$V_{scatter}^2 = \frac{2\pi K_{11} d}{\varepsilon_0 \varepsilon_{parallel}(1 - \sigma_{parallel}/\sigma_{normal})\lambda}, \qquad \text{Equation 3}$$

The companion to this relation is that which drives (at higher frequency) the re-alignment of the molecular dipoles to re-orient the molecular axes normal to the glass surfaces, parallel to the field, thus, $$V_{clear}^2 = \frac{2\pi K_{11} d}{\varepsilon_0(\varepsilon_{parallel} - \varepsilon_{perpendicular})\lambda}, \qquad \text{Equation 4}$$

From this scenario we might note that the factors critical to optimizing operational performance are the dielectric (also refractive index) and conductivity anisotropy. These observations are certainly true and have been validated by much of the literature, however, the factors K and λ also have critical operational implications.

$$\lambda = \left(\frac{K_{11}}{B}\right)^{1/2}, \qquad \text{Equation 5}$$

Here the expectation in simple organic smectic A liquid crystals is that the characteristic length will be of the order of the layer spacing until you approach the nematic transition where B (the elastic modulus for compression) rises. (Ref.: de Gennes, P. G., ref 9).).

We would note that the voltages predicted by these equations are threshold voltages, for the first onset of the electro-optic effect. This will be very different (and much lower) than the practical drive voltages required to drive the electro-optic effects at full contrast.

WO 2009/111919 (Halation) discloses an electrically controlled medium for modulating fight includes two plastic thin film layers and a mixture layer is provided between the two thin film layers. The mixture layer consists of smectic liquid crystals, polymeric molecule materials and additives. The liquid crystals used have a polysiloxane chain having a mesogen at one or both of its ends. The polymeric materials appear to be polymerised in situ to divide the space between the film layers into small cells. Conductive electrode layers 4 are provided on the sides of the two plastic thin film layers and the liquid crystal molecules exhibit different alignment states by controlling the size, frequency and acting time of the voltage applied to the conductive electrode layers, so that the electrically controlled medium for modulating light may be switched between a blurredly shielding state and a fully transparent state and even may be switched among a plurality of gradual states of different gray levels. The composition differs from that of the present invention in that it does not include components (c) and (d) of the composition of the present invention and so lacks the properties of the present invention, as discussed below.

EP 0 529 597 (Sumitomo) discloses a liquid crystal display device having a pair of electrodes at least one of which is transparent and a self-supporting liquid crystal film which is placed between the pair of electrodes. The liquid crystal film contains (i) a copolysiloxane backbone where some siloxane units contain a side chain that includes a mesogen (A) and other siloxane units are dimethylsiloxane units that do not include a mesogen (B), (ii) a low molecular weight liquid crystal and (iii) an electrolyte or dopant, which is a tetra-$C_{1-6}$ alkyl ammonium salt having a bromine counterion. When switched between the clear and opaque states, both the backbone and the mesogenic side chains move and this limits the response speeds. The liquid crystal composition has a smectic A structure but, because the mesogen units are located as side chains along the length of the polysiloxane chain, it lacks the nanoscale siloxane rich sub-layer structure i.e. it does not contain the multi-layered template of the present invention, which is derived in the present invention from oligosiloxane chains having a terminal mesogen group; as more fully discussed below, which gives the present invention its unique properties, which are not shared by the composition of EP 0529597. The topology of the connectivity between the dimethylsiloxane units and the mesogenic units differs significantly between the present invention and EP0529597. In particular, the composition of EP 0529597 will have a poor lifetime and a limited range of operational temperatures, and poor texture and scattering efficiency due to the uncontrolled dilution via the introduction of random dimethylsiloxane units. Furthermore, the compositions are believed to have slow switching speeds; the specification discloses switching speeds but docs not disclose the field applied in order to achieve these speeds and does not disclose the degree of scattering achieved by the switching operations.

U.S. Pat. No. 5,547,604 (Coles) discloses a polysiloxane liquid-crystal having an oligosiloxane chain with a mesogenic terminal grouping. Compositions are described that have a smectic A structure. However, this patent does not disclose the incorporation of a side chain liquid crystal polymer to enhance scattering, as required by the present invention.

DISCLOSURE OF THE INVENTION

The present invention provides a thermotropic liquid crystal smectic A composition exhibiting a smectic type A phase made up of multiple layers and capable of forming a liquid crystal optical device, e.g. a display, when sandwiched between a pair of electrodes as set out in the following claims as well as cells containing such a composition. The present invention also provides an optical device containing multiple cells and a method of switching the optical properties of the composition by applying an electric field thereto.

The present invention provides a viable SmA formulation, which may be the basis in reflective (or lit) display systems, and related applications, are described. The formulation enables scattering displays suitable for a diversity of reflective display applications and it is believed that, for the first time, there is provided a commercially viable material for SmA based devices.

In accordance with one aspect of the present invention, there is provided a thermotropic liquid crystal smectic A composition exhibiting a smectic type A phase made up of multiple layers and capable of forming a liquid crystal optical device, e.g. a display, when sandwiched between a pair of electrodes, wherein:

under the influence of different electric fields applied between the electrodes, the alignment of the layers of the composition can become more ordered or more disordered, the composition has stable states in which the alignment of the layers of the composition are differently ordered including an ordered state, a disordered state and intermediate states, the composition being such that, once switched to a given state by an electric field, it remains substantially in that state when the field is removed, which composition comprises, in weight %:
  (a) 25-75% in total of at least one siloxane of the general formula I:

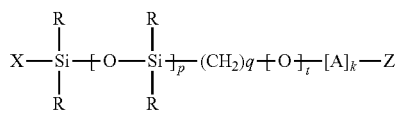

wherein
  $p=1$ to 10, e.g. 1 to 3,
  $q=1$ to 12, e.g. 6 to 10,
  $t=0$ or 1,
  $k=2$ or 3,
  A is a phenyl or cyclohexyl ring which may be the same or different and are bonded together in para positions,
  $R=$ a $C_{1-3}$ alkyl group, e.g. methyl, which may be the same or different,
  $X=$ a $C_{1-12}$ alkyl group, and
  $Z=$F, Cl, Br, I, CN, $NH_2$, $NO_2$, $NMe_2$, NCS, $CH_3$, or $OCH_3$, $CF_3$, $OCF_3$, $CH_2F$, $CHF_2$ especially CN;

(b) 0.001-1% in total of at least one quaternary ammonium salt of the general formula II:

wherein:
  $v=1$ to 30, for example $v=9$ to 19, e.g. myristyl ($v=13$, T=methyl) or cetyl ($v=15$ and T=methyl),
  R1, R2 and R3, which may be the same or different, are $C_{1-4}$ alkyl, e.g. methyl or ethyl,
  T=a methyl group or a silyl or siloxane group and
  $Q^-$ is an oxidatively stable ion, especially a $ClO_4^-$ ion, (c) 20-65% in total of at least one polarisable linear molecule having an alkyl chain, the molecule having the general formula III:

wherein:
  D stands for a $C_{1-16}$ straight chained alkyl or alkoxy group optionally containing one or more double bonds;
  $k=2$ or 3,
  A' is a phenyl, cyclohexyl, pyrimidine, 1,3-dioxane, or 1,4-bicyclo[2,2,2]octyl ring, wherein each A may be the same or different and are bonded together in para positions, the terminal ring attached to Y optionally being a phenyl and
  Y is located in the para position of the terminal ring of the group $A'_k$ and is selected from Z (as defined above in connection with Formula I), $C_{1-16}$ straight chained alkyl, $C_{1-16}$ straight chained alkoxy, $OCHF_2$, $NMe_2$, $CH_3$, $OCOCH_3$, and $COCH_3$; and (d) 2-25%, optionally 5-15%, in total of at least one side chain liquid crystal polysiloxane of the general formula IV:

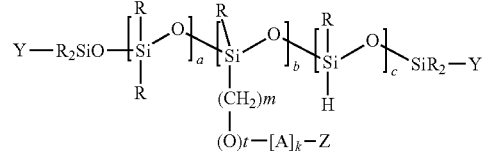

wherein:
  a, b and c each independently have a value of 0 to 100 and are such that a+b+c has an average value in the range 3 to 200, e.g. 5 to 20; and a is such that the chain units of the formula Y—$R_2$SiO—[$SiR_2$—O]$_a$ represents 0 to 25 mole percentage of the compound of the general formula IV, and c is such that the units of the formula chain —[SiHR—O]$_c$—$R_2$SiO-Y represents 0 to 15 mole percentage of the compound of the general formula IV,
  $m=3$ to 20, e.g. 4 to 12;
  $t=0$ or 1,
  $k=2$ or 3
  A is a phenyl or cyclohexyl ring which may be the same or different and the rings are bonded together in para positions, R=a $C_{1-3}$ alkyl group, e.g. methyl, each of which may be the same or different, and Y=a $C_{1-12}$ alkyl group, a chromophore or a calamitic liquid crystal group and each of which may be the same or different, and Z is as defined above in connection with Formula I.

and wherein the amounts and nature of the components are selected such that the composition possesses smectic A layering, as detected by X-ray diffraction.

DETAILED DESCRIPTION OF THE INVENTION

The composition of the present invention has several components, which will be described in turn.

Host Mesogens (Component (a))

The first component is least one siloxane of the general formula I defined above. This mesogen is siloxane tagged to drive the phase partitioning. Other organic mesogens (not necessarily themselves having any smectic character) form part of the composition—see discussion of component (c) below). The resultant smectic A host is designed to operate via an internal phase partitioning, which drives the phase condensation and properties and it is, in this way, possible to achieve smectic order, layering, that has unusual stability relative the norm in simple organic systems. This is explained in further detail below.

In the classes of silicon containing mesogens and formulations herein studied, the properties critical to the application merit are derived from the internal phase segregation and the consequent sub-structure resultant thereon. This behaviour is driven by the marked aggregation and partitioning tendency of the siloxane rich sub-layer. The siloxane moiety is well known for its remarkable back-bone flexibility and the free volume conferred by this behaviour makes silicone fluids less dense than might be expected and confers exceptional permeability to siloxane polymers. In the case of these oligomers and smaller molecules it is the driven supramolecular assembly that causes the very strong layers and consequently marked anisotropy beyond the norm for smectic liquid crystals which do not have this moiety.

The degree of stability of the phases and the preferred phase properties and consequent thermal stability etceteras may be pre-determined by selection of the cyclo (aromatic or non-aromatic) core $[A]k$ and the aliphatic tail length $(CH2)q$ of the mesogen of the Formula I above, in balance with the siloxane adduct. The aliphatic tail is preferably not too short since they are harder to synthesise due to competition in side reactions; similarly the sources of synthons at suitable price and purity favours certain choices over others. Thus, a shorter aliphatic unit (say, in the range 7-9 carbon) may favour SmA and in these cases the attachment of a siloxane unit, e.g. 1,1,1,3,3-pentamethyldisiloxane, will drive layering and some favourable properties. Increasing the aliphatic length, excessively will eventually frustrate mesogenicity (if there is sufficient transverse dipole strength then it may introduce Smectic C, or other character). If the siloxane is increased in length or made more bulky, it may similarly be observed that new phase behaviours become observable up to some limit whereupon the phase is destabilised.

Figure 1:
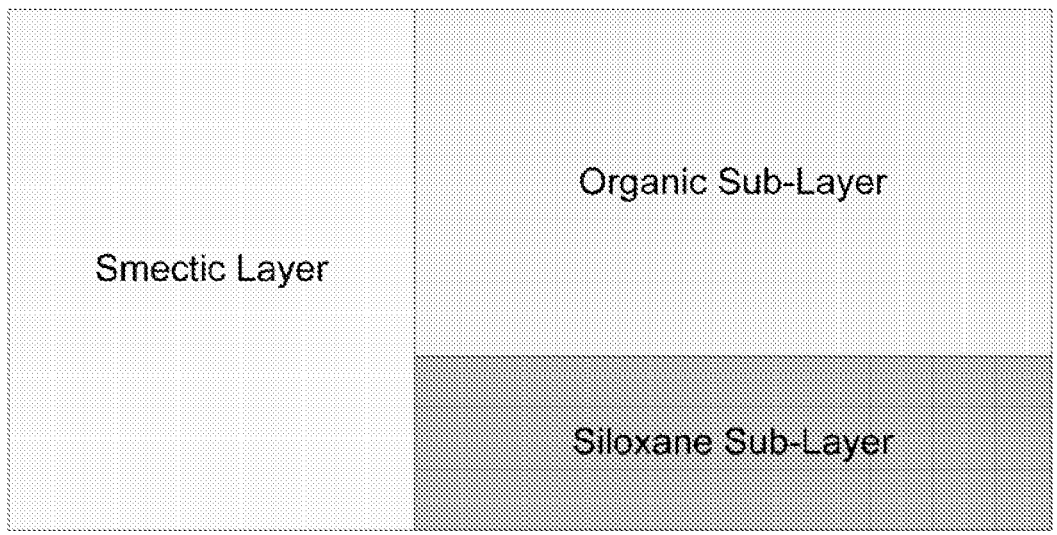
FIG. 1 is an illustration of a simple schematic of the substructure that forms in phase partitioned smectic-A layered systems when driven by siloxane-derivatized mesogens showing its layering and sub-structure

FIG. 1 is an illustration of a simple schematic of the substructure that forms in phase partitioned smectic-A layered systems when driven by siloxane-derivatized mesogens showing its layering and sub-structure. The smectic layers comprise sub-layers that have a thickness on the nanometre scale (1-10 nanometres). Although we do not wish to be bound by any theory, we believe that dispersive forces act on the $[A]_k$ moiety of component (a) to fill space and satisfy coulombic interactions of the dipoles in that moiety, causing the $[A]_k$ moieties to form a sublayer. The balance of these forces rejects the siloxane moiety into a further segregated layer, adjacent the aliphatic $(CH_2)q$ chain to which it is attached. Thus, as reported by Tscheirske *J. Mater. Chem.* 1978, 8(7), 1485-1508, it is likely that the sublayering actually involves three distinct layers, namely a siloxane layer, an aliphatic layer formed by the aliphatic (CH2)q chains and an aromatic layer formed by the mesogens. It is possible that the sub-layering is even more complex and involves a symmetrical layering with a central layer, which may be the siloxane-rich sublayer, having the other layers extending symmetrically on either side of this central layer. However, whatever the actual structure of the sublayering, it remains the case that the sub-layering stabilises the Smectic A structure and this stabilization is exploited in the new composition of the present invention, as discussed elsewhere.

The Tschierske paper also discusses the structure of liquid crystal polysiloxane copolymers, that having a copolymeric polysiloxane backbone, as used in the composition of EP 0527597 (Sumitomo), where it is noted that the phase segregation is "biphasic", inferring segregation into smectic and isotropic phases co-existing at a greater size scale than the sub-layering that we exploit in the present invention.

This stable sub-layering allows the structure to accommodate a substantial amount of other compounds, such as components (c) and (d) of the composition, which in turn allows the properties of the composition to be tailored in a way that was not hitherto possible. However, the increased strength of the SmA layers as a result of this sub-layering has the substantial disadvantage of causing a composition consisting of only components (a) and (b) to crystallise at a lower temperature (cold crystallise), which would normally mean that they could not be used commercially. However, the addition of the side chain liquid crystal polysiloxane (component (d)) prevents this cold crystallisation and make the overall composition commercially attractive.

The use of this sublayering to make a liquid crystal composition that can accommodate substantial quantities of other components, thereby allowing the composition to be tailored to specifically desired properties, e.g. low or high birefringence, and that is not subject to a level of cold crystallisation that would otherwise render the composition uncommercial has not been proposed previously. In particular:

WO 2009/111919, which discloses a liquid crystal composition, would probably, at least in some embodiments, provide the above sub-layer structure but it would then be subject to cold crystallisation as discussed above. Also, the sub-layering effect was not taught by this WO document, nor was it appreciated that the sub-layering would allow the tailoring of the properties of a liquid crystal composition by accommodating a substantial amount of other components without breaking up the SmA structure. This can be seen from the composition that is taught by this document, which does not include components (c) and (d) of the composition of the present invention, the former allowing the properties to be tailored and the latter allowing the problem of cold crystallisation to be overcome and the extension of the operational temperature range.

The liquid crystal composition disclosed in EP 0 527 597 (Sumitomo) lacks the ability to form the segregated sub-layered structure of the present invention because the mesogen units are located as side chains along the length of the polysiloxane chain rather than as terminal groups as in component (a) of the present invention. Further more as one skilled in the art appreciates, the dimethylsiloxane groups of the copolymer in EP 0527597 are random and therefore unable to form self-defined sub-layered structures. Component (d) of the composition of the present invention also has side chain mesogen groups but these fit into the sub layer structure imposed by component (a) and they cannot themselves give rise to this structure.

We have determined that many of these advantages are obtained with both types of silicon augmented SmA phases. Preferred exemplars and descriptive examples are offered below.

In the first instance, the mesogenic molecules of component (a) have the properties usually associated with the formation of liquid crystal phases, but have a siloxane oligomeric moiety integrated into the molecule. This has been demonstrated in previous filings for example (Coles, Hannington et al., U.S. Pat. No. 5,455,697A; U.S. Pat. No. 5,547, 604A). However, this property may be further enhanced if the mesogen is synthesised to have an optimum ratio between the mesogenic core and a silicon-containing 'tail' moiety. Compounds of the two formulae below, illustrate such a phase depiction and representative molecules, showing the key performance directing factors in the mesogen design.

Some of the early work on SDS devices that has been referenced here used mixtures of 8CB that is not augmented with silicon:

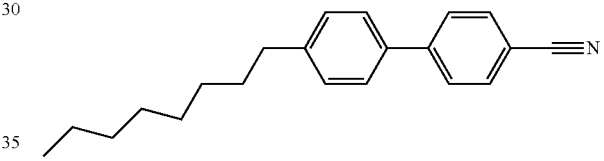

and its alkoxy variant (8OCB) in the host SmA phase. 8CB is one of a homologous series of mesogens that are nematic when the aliphatic chain is shortened and show smectic phases at higher chain lengths prior to losing mesogenicity. Such simple aliphatic tailed mesogens are characterised by fairly small Smectic A phase ranges:

8CB is marginally smectic over 2° C. to around 40° C.;
9CB has the recorded behaviour, Cr->42° C.->SmA->48° C.->N->49.5° C.->I;
10CB, Cr->44° C.->SmA->50.5° C.->I; and
12CB, Cr->48° C.->SmA->58.5° C.->I.
where "Cr" stands for crystalline, "N" stands for nematic and "I" stands for isotropic.

Such mesogen mixtures as were studied in the early investigative programmes were formulated to provide the best approach to a wider phase stability range and balance of reliability with environmental specifications as was possible. However, in the event the technology was not able to overcome the limitations of hosts such as these.

In contrast the phase partitioning silicon augmented molecule, e.g. Si2-8OCB, (8-(4-cyanobiphen-4-oxy)octyl)pentamethyldisiloxane

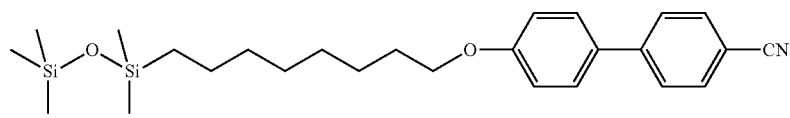 [SMILES: C[Si](C)(C)O[Si](C)(C)CCCCCCCCOc1ccc(-c2ccc(C#N)cc2)cc1]

has a very wide SmA phase range, e.g. <10° C. to >64° C. because of the strength of the sublayers. These bounds are amenable to adjustment but are indicative that such mesogens are very attractive to study in such applications as are herein discussed.

In the present specification, the term "Sin", where n is a number, denotes the addition of a mesogen augmented with n siloxane units.

Si2-8OCB is an example of a siloxane derivatised SmA material; note the marked dipole character imbued by the terminal CN coupled with strong molecular form anisotropy, the phase partitioning siloxane moiety terminal to the organic spacer chain, attached para to the CN on the biphenyl aromatic core. Many other such molecules have been made and, if conveying similar design attributes, offer value in the formulations described herein.

Ionic Dopant (Component (b))

As discussed in the prior art section, the ionic dopant migrates through the composition when low frequency electric (or dc) fields are applied across the composition, thereby disrupting the order to the composition. Order in the composition can be restored by applying a higher frequency field that does not allow the dopant time to migrate significantly and yet causes the mesogens to align with each other.

Smectic A phases usually have a positive dielectric anisotropy and an ionic dopant is added to disrupt and re-align the layer structure of SmA liquid crystal as the dopant migrates through the composition under the influence of certain electric fields (generally low frequency or non-alternating fields) applied across the liquid crystal composition. The electrohydrodynamic instability of the liquid crystals necessary to bring about dynamic scattering can only occur if the conductivity anisotropy is negative, i.e. the direction of easy conductivity of the dopant ions is in the plane of the layers and orthogonal to the average direction of the long axis of the molecules. A wide range of negative conductivity anisotropies has been measured in the composition of the present invention, ranging from just above unity to greater than 10. The value depends on both the electrolyte (the smectic A phase) and the dopants used.

Three issues dominate the choice of the ionic dopants:
  i) The ability of the ions to disrupt and re-align the layer structure of SmA liquid crystal. Small ions exhibit conductivity anisotropy, but do not cause dynamic scattering in the liquid crystal host. It is usually the cation (the positive ion) that causes scattering and quaternary ammonium compounds are suitable for this purpose in the context of the present invention; Crossland et al 1976 (P1) have already proposed the use of quaternary ammonium compounds as ionic dopants, as has a detailed study carried out with halide counter ions in 1987 (Coates, Davey et al ref 4). The ionic compounds are of the form $(R_1R_2R_3R_4N)^+, X^-$ where $R_1$, $R_2$, $R_3$ or $R_4$ may be alkyl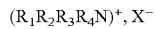 groups, which may be the same or different.

In the present invention, $R_4$ needs to be an alkyl hydrocarbon chain with greater than 8 carbon atoms, preferably 12-18, in order to promote disordering of the mesogens. The nature of the remaining three groups can control the retention of the substituted ammonium ion at surfaces in contact with the composition.

If $R_1$, $R_2$, $R_3$ are unsubstantial (i.e. they are H atoms), then there is a danger that the absorption of ions at the electrodes (and other surfaces) will deplete their concentration in the bulk. Crossland et al 1976 (P1) disclosed the use of selected hexadecyl tri-methyl ammonium salts with halide counterions, and this has been followed by most subsequent workers (e.g. Coles et al 2007 ref 7). On some surfaces (e.g. relatively rough surfaces of indium-tin oxide films on glass) tri-methyl derivatives might still be absorbed over long periods of time and display operation, in which case $R_2$ and/or $R_3$ might be replaced with $C_2$, $C_3$ or $C_4$ alkyl groups. For example 100 to 400 ppm of hexadecyl butyl di-methyl ammonium salt gives efficient scattering in a range of smectic A hosts.

Within the above stated limits the solubility of such dopants in smectic A hosts is excellent and they show very little tendency to be electro-chemically reduced.

ii) Crossland et at 1976 and subsequent publications (P1, P2, P3, 1, 2, 3) disclosed the use of bromide (Br) counter ions i.e. $X^-=Br^-$. This has been followed by other authors (e.g. Coles et al, 2007 ref 7). Devices made with bromide counter ions are suitable for short term tests, but fail to survive long term device operation (this is illustrated below, but typical performance of literature attempts at the SDS applications seldom achieved more than a few 10,000 s of cycles, see, for example, P8).

The present invention also provides the use of a dopant (component (b)) that is a quaternary ammonium ionisable species. For example, the dopant (component (b)) is a quaternary ammonium salt. The counterion is oxidatively stable in a liquid crystal optical device, e.g. in a display having a thickness of 5-15 µm across which is applied a field of 2-20V/µm.

Perchlorate anions provide an especial advantage in SmA compositions since they have been found unexpectedly to increase the lifetime of SmA displays using quaternary ammonium ionic dopants. Although perchlorate ions are known in non-SmA liquid crystal formulations, especially with respect to oxidation stability (see for examples refs 13, 14), neither of references 13 and 14 teaches that the use of a perchlorate dopant might increase the lifetime of SmA compositions. Our tests have established that perchlorate counter ions ($ClO_4^-$) display improved performance relative to other possible counter ions (such as bromide) and strong evidence of electro-chemical stability to oxidation in the hosts herein described (at least in part due to their already highly oxidised state). Within an appropriate choice of smectic host they can certainly survive greater than $10 \times 10^6$ scattering operations.

Our investigations have shown that the use of quaternary ammonium perchlorates, as the dopant, has been observed to deliver a wide range of conductivity anisotropy in SmA hosts, ranging from 2 to greater than 10. These materials have been found to be highly electro-chemically stable and capable of introducing strong scattering in both totally organic smectic A phases, e.g. in near eutectic mixtures of alkyl and alkoxy cyano-bi-phenyl mixtures (containing 8CB and 8OCB), and in SmA phases containing siloxane derivatives (see later embodiments).

iii) Quaternary ammonium compounds with long hydrocarbon chains are surfactants and adsorb onto glass surfaces with the hydrocarbon chain oriented orthogonal to the surface. As such they align liquid crystals with their director orthogonal to the surface (homeotropic alignment). In SmA scattering displays there is an equilibrium between dopant dissolved in the liquid crystal and dopant adsorbed onto the surfaces of the containing cell. This can be controlled by varying the size of the substituents $R_2$, $R_3$ and $R_4$ in order to avoid depletion of the dissolved dopant from the liquid crystal solvent and, on the other hand to promote homeotropic alignment and therefore lower the voltages required to give efficient clearing of light scattering textures. We believe that $R_2$, $R_3$ and $R_4$ should not all have the same length, e.g. $R_2$ may be a $C_2$, $C_3$ or $C_4$ alkyl group and $R_3$ and $R_4$ may be methyl.

In summary, preferred dopants are quaternary ammonium perchlorates of the form:

$(R_1R_2R_3R_4N)^+(ClO_4)^-$ where $R_1$ is an alkyl chain between $C_8$ and $C_{18}$ and all of $R_2$, $R_3$, $R_4$ are at least $C_1$ with one or two of them optionally being $C_2$ or greater and the longest alkyl group optionally bearing a terminal silyl or siloxane group.

These dopants are designed to:
- avoid depletion of dopants by adsorption onto the interior surfaces of the containing cell
- promote homeotropic alignment in order to give efficient clearing
- avoid oxidation and reduction at the anode and cathode electrodes
- exhibit negative dielectric anisotropy in SmA hosts
- align and disrupt SmA structures when the anions migrate under an electron field in the SmA host Such dopants have been found to be effective in concentrations of 10 to 400 ppm in SmA electrolytes that may be purely organic (e.g. 8CB, 8OCB mixtures) or may contain siloxane derivatives (as described below).

These dopants are especially beneficial in the composition of the present invention, where the strong sub-layering effect helps to keep the dopant in the organic mesogen layer, where its passage is easiest, and prevents dopants from moving between layers and so the conductive anisotropy of the composition of the present invention is high. The confinement of the dopant to layers is believed to reduce the overall migration of the dopant under applied alternating current to the electrodes, where there is a possibility that they can be consumed. It is often the loss of dopant that determines the overall life of a liquid crystal cell.

We have found that the use of a tetraalkyl dopant in which one of the alkyl groups has a silyl or a siloxane terminal group is especially beneficial because it imparts further solubility control on the dopant.

Polarisable Linear Molecule Having an Alkyl Chain (Component (c))

We have observed that nematic liquid crystal phases, that may or may not exhibit a smectic phase at lower temperatures, can be converted to a stable wide temperature range SmA phase by the simple addition of silicon based compounds (component (a)), notably siloxane small molecules and oligomers, that may not have complementary liquid crystal phases, and in some cases lack the normal features that result in liquid crystal formation. The nematic liquid crystal phases treated in this manner can be complex eutectic mixtures that have been formulated to achieve special properties (e.g. high or low birefringence, high dielectric anisotropy etc). To some extent, these special properties may be carried over into the induced SmA phase.

Put another way, the polarisable linear molecule having an alkyl chain of component (c) can be incorporated into the SmA structure formed by the siloxane of component (a) and can alter the properties of component (a), especially its birefringence. Thus the present invention provides a way of producing a SmA liquid crystal composition tailored to have particular properties.

Siloxane derivatised small molecules and oligomers (component (a)), whose organic moiety is of a nature complementary to the guest component (c) organic (formerly nematic), in the SmA phases, are particularly efficient at inducing SmA phases.

Formulation of siloxane modified SmA-directing species has been shown to allow many nematic molecular systems to be rendered layered. This opens the door to strategies that can exploit the very rich landscape of nematic mixtures and by judicious formulation with appropriate siloxane species and ionics, new SmA formulations may be formed. By the careful design of complementary species it is possible to considerably broaden the range of smectic ordered liquid crystals starting from a simple organic nematic base component (c) and employing formulations with phase directing siloxane adduct species component (a).

For the phase partitioning smectic liquid crystals we would expect that the characteristic length (the factor, $\lambda$, in Equation 5, above) will be slightly larger than that in simpler molecular systems. The reasons for this include the fact that these materials are expected to be slightly more compressible due to the poorer volume packing. Another factor is that the layer spacing tends to be higher in such systems, for similar organic species the layer spacing (for 8CB) is about 30 nm which can be compared with the formulation which has a spacing of 34-37 nm (40 nm for pure siloxane mesogen), see graphs provided below).

For example, if a low birefringence SmA composition is needed, this cannot be achieved using a purely organic liquid crystal since, in organic analogues, the liquid crystals do not have a SmA structure since 4-(trans-4-n-alkylcyclohexyl) are all nematic for n=1 to n=12. For the organic biphenyl analogues, SmA only occurs at n>7 which has a high birefringence. Thus the present invention provides the potential to produce low brief SmA formulations using the composition of the present invention where component (c) has a low birefringence. For example, component (a) can be a hybrid oligosiloxane cyanobiphenyl, which has a lower birefringence than the corresponding cyanobiphenyl, in conjunction with a low birefringence component (c), e.g. a cyclohexyl phenyl, to produce a low birefringence SmA formulation which would not be obtainable using an all organic (i.e. no siloxane) formulations.

Another property that can be tailored using component (c) is the rheology of the composition, which is affected both by the amount and the nature of the component. Increased amounts of the component tend to weaken the sub-layered structure and make it less viscous while small, unbranched molecules make the composition less viscous than large branched molecules. The composition of the present invention is preferably liquid and has a suitable viscosity that enables it to be filled in to liquid crystal devices, such as displays, on a commercial scale.

The above observations provide the basis for the developments herein and frame the principle drivers to develop formulations that can harness the siloxane moieties propensity to drive smectic layering in simple organic species.

Tables 1 and 3 set out some high birefringence materials and low birefringence materials that can be used in the present invention.

In addition, components (c) tend to be cheaper than components (a) and (d) and so their use in the composition can lower the overall cost of the composition.

Side-Chain Liquid Crystal Polysiloxanes (SCLCP) Component (d))

Figure 19:
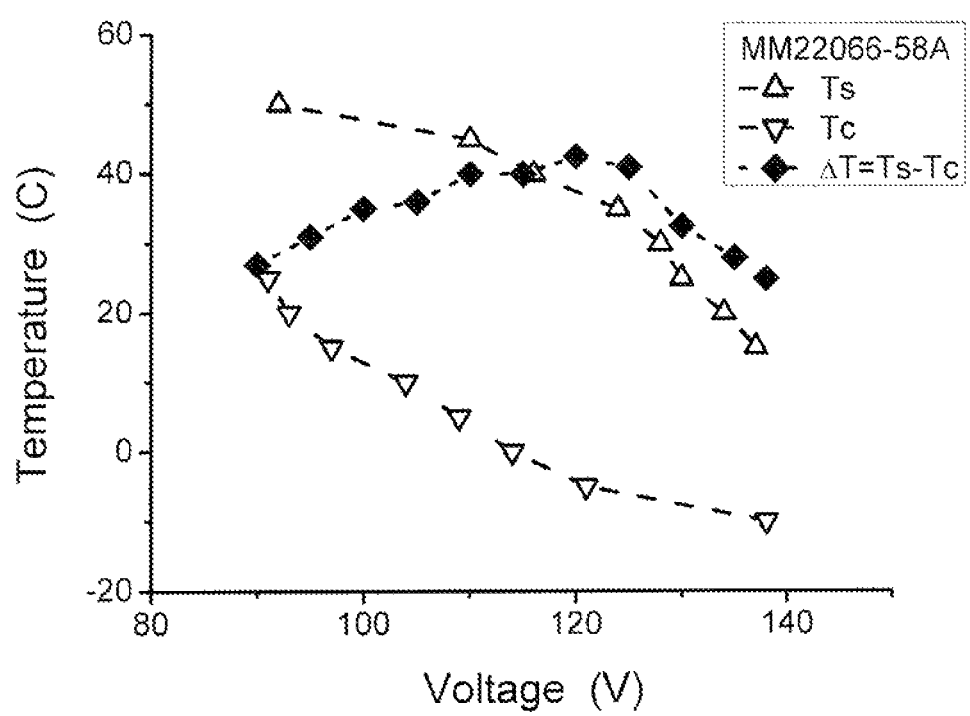
FIG. 19 is a graph of voltage versus temperature for SmA formulation MM22066-58A.

The additions of Side Chain Liquid Crystal Polysiloxane of the general Formula IV, as set out above, to components (a) to (c) allows such systems to be further moderated. They can be considered as binding together the layers, both within a given layer and between layers. This allows the composition to be tailored further, especially in providing a higher clearing temperature and eliminates cold crystallisation of the composition and controlling the domain size in the relatively disordered states (see FIG. 5 below); it also moderates ionic conduction of the dopant (component (b)) and so extends the life time of an optical device containing the composition since a major cause of the failure of such devices is the depletion of the dopant. These additives can also be used to raise the clearing temperature, thus expanding the working temperature range of the formulation. An example of the operational temperature range of an example formulation MM22066-58A (see Table 2 for the composition) is given in FIG. 19, which shows, for a given driving voltage (amplitude) and at a driving frequency for scattering of 50 Hz, and for clearing of 3 kHz:

Ts—Maximum scattering temperature
Tc—Minimum clearing temperature
ΔT—Working temperature range It is clear that the maximum working temperature range is ~60° C.>ΔTmax (Ts=50° C. at 90V, Tc=−10° C. at 140V, hence 60° C.), while the greatest ΔT value is obtained at about 42° C. at 120V) In fact, the maximum working temperature range can be further extended to 70° C. by increasing the clearing voltage to 160V where Tc=−20° C.

SCLCP additives of the general Formula IV in which a=0 are preferred, as the clearing temperature of the SCLP, and thus its impact on the clearing temperature of the formulated composition, are reduced as these mole percentage of dimethyl siloxane groups are increased. For example, referring to formulation component d), when: i) Y=Methyl, a=20, b=10, c=0 Tc=25.8 C; ii) Y=Methyl, a=15, b=15, c=0 Tc=58.4 C and iii) Y=Methyl, a=0, b=40, c=0 Tc=136.3 C, where Tc=the onset of the smectic A to isotropic clearing transition. In addition, it allows the amount of component (c) that can be contained within the composition without losing the SmA structure to be increased.

In the compound of formula IV, "a" may be zero. If amounts of a compound of the formula IV is included in the composition in which "a" is greater than zero, such a compound is preferably added in combination with a compound in which "a" is zero and the amount of the compound in which "a" is not zero is preferably limited to less than 5% by weight, and preferably less than 2% of the weight of the composition.

These novel formulations according to the present invention result in stable and robust SmA phases arising out of the stable sub-structure discussed above: small angle X-ray scattering has established their layered nature, differential scanning calorimetry (DSC) establishes their phase sequences and optical microscopy has demonstrated that they exhibit the classic textures of smectic A phases (see above, albeit they are exceptional in many ways).

Figure 2:
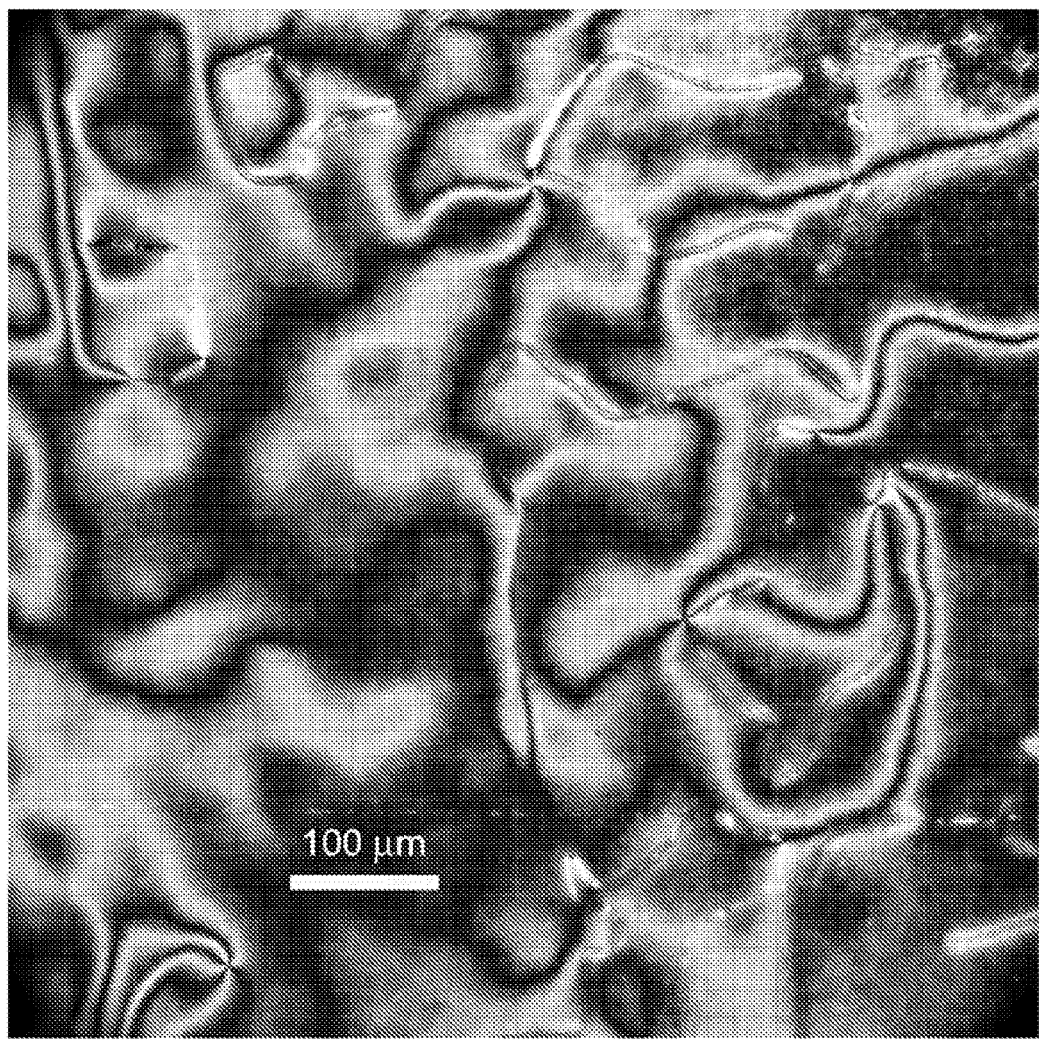
FIG. 2 is a micrograph of a pure organic nematic composition.
Figure 3:
FIG. 3 is a micrograph of pure Si2-8OCB mesogen.

We have further determined that although these formulations are made inclusive of organic, low molar mass, nematic liquid crystal phases (that themselves had no silicon containing moieties), when they are incorporated into device structures (with suitable dopant additions etc) they exhibit the distinctive advantageous properties, that may be seen to derive from the silicon augmented species driving smectic A phases of preferred parameterisation. We can illustrate the difficulty of developing such formulations by providing examples, wherein we can show that although apparently similar approaches may superficially work, the full formulation is required for applications such as those described above (see below). In demonstration of this precept FIGS. 2 to 5 show micrographs of four samples:

FIG. 2: the nematic liquid crystal phase texture of Merck BL003 commercial nematic liquid crystal formulation, as observed using a polarized light optical microscope, at room temperature;

FIG. 3: Smectic A liquid crystal phase texture of the oligosiloxane modified mesogen Si2-8OCB, as observed using a polarized light optical microscope, cooled from the isotropic phase to the biphasic SmA+I region.

Figure 4:
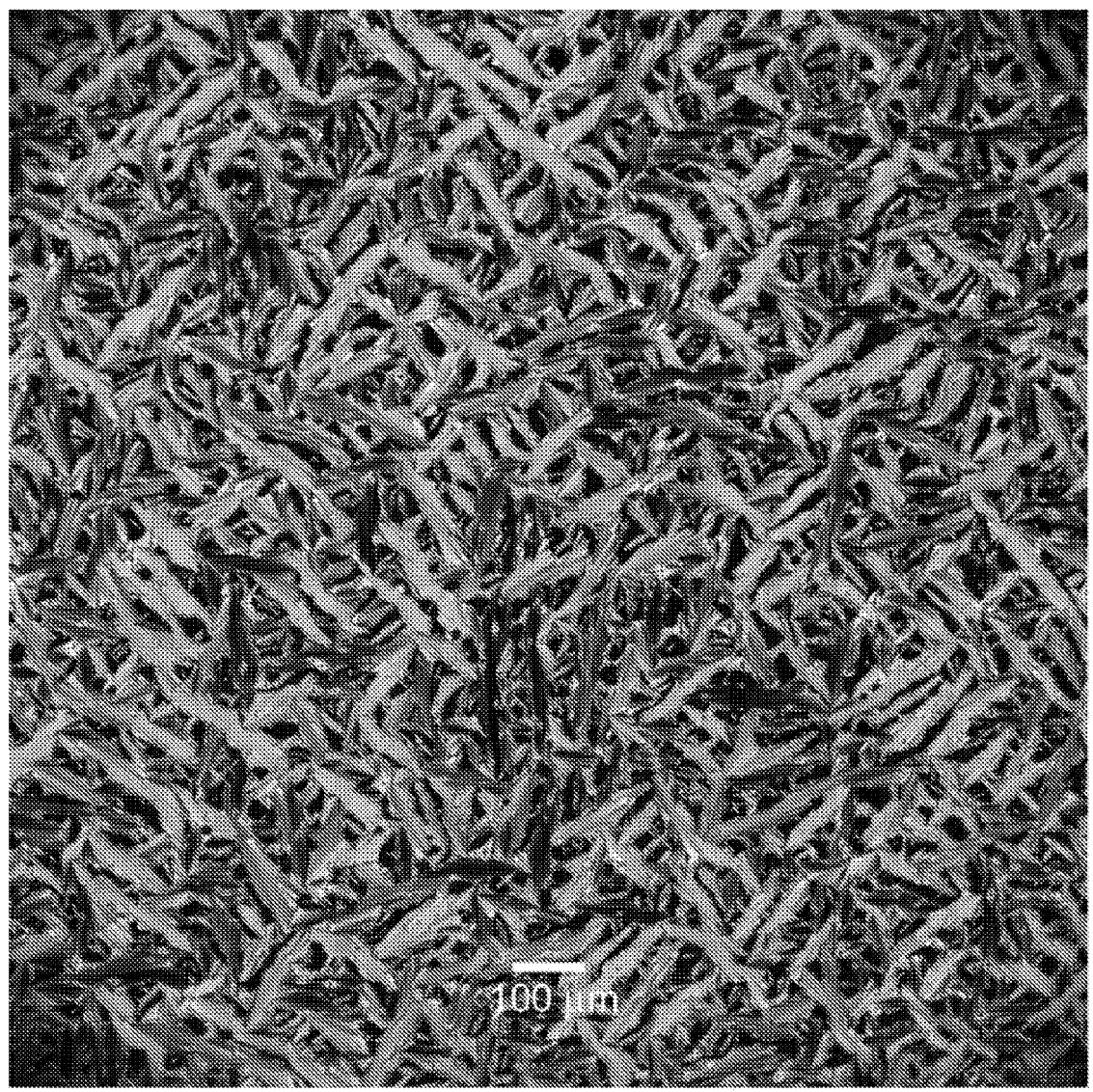
FIG. 4 is a micrograph of a polymer formulation agent.

FIG. 4: Smectic A liquid crystal phase texture of a side chain liquid crystal polysiloxane used in the claimed formulations oligosiloxane, as observed using a polarized light optical microscope, cooled from the isotropic phase to the biphasic SmA+I region.

Figure 5:
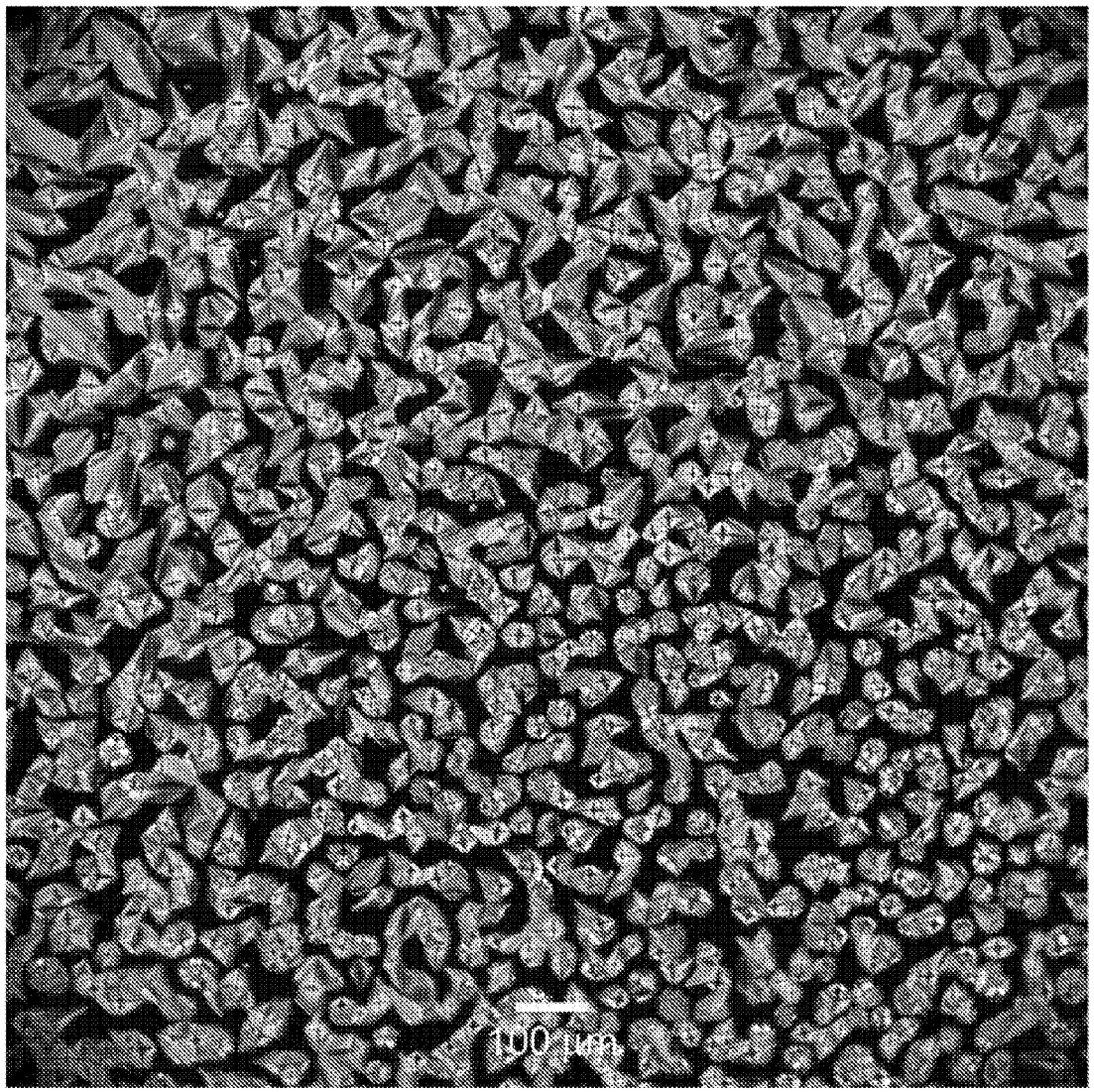
FIG. 5 is a micrograph of a according to the present invention.

FIG. 5: Smectic A liquid crystal phase texture of a formulation comprising an oligosiloxane modified mesogen Si2-8OCB, Merck BL003, and a side chain liquid crystal polysiloxane, as observed using a polarized light optical microscope, cooled from the isotropic phase to the biphasic SmA+I region. Apart from the dopant, this composition is in accordance with the present invention.

Herein it is clear from the textures that the formulation of FIG. 5 has homogeneously transformed the nematic component (Merck BL003) and accommodated it within a smectic host (Si2-8OCB), and that the addition of the side chain liquid crystal polysiloxane has modified the phase and that the resultant is a very uniform texture of small "fans". Further description of this formulation and the differences between this approach and others is provided below.

In the photomicrographs of FIGS. 2 to 5, the systems have been photographed at the transition between isotropic and smectic to best demonstrate the spontaneous condensation into a well specified phase texture, determined by formulation (in that case) to have the fineness of texture desired in the applications field.

In essence the choice of a suitable siloxane oligomer of the AB type (component (a)) may be seen to construct a layered SmA system of particular spacing and "strength". Within this structure the role of the low molar mass nematic mesogen (component (c)) may be considered to be that of a "plasticiser" which moderates the layer "strength"; while simultaneously providing tuneability to the properties of the composition, e.g. its refractive index or dielectric anisotropy. The additions of Side Chain Liquid Crystal Polysiloxane of the general Formula IV, as set out above, then allows such systems to be further moderated. They can be considered as binding together the layers, both within a given layer and between layers. This allows the composition to be tailored further, especially in providing a higher clearing temperature, and controlling the domain size in the relatively disordered states; it also moderates ionic conduction of the dopant (component (b)), leading to a longer life for a cell containing the composition. In addition, it allows the amount of component (c) that can be contained within the composition without losing the SmA structure to be increased. The constituents (a) to (d) thus form a formulation design space enabling applications in respect of dynamic scattering. Guest chromophores may then be selected compatible with design targets and similarly complementary to the formulation.

The novel formulations according to the present invention result in stable and robust SmA phases: small angle X-ray scattering has established their layered nature and especially the presence of the sub-layers within the SmA layers, differential scanning calorimetry establishes their phase sequences and optical microscopy has demonstrated that they exhibit the classic textures of smectic A phases (see above, albeit they are exceptional in many ways).

We have further determined that although these formulations are made inclusive of organic, low molar mass, nematic liquid crystal phases (that themselves had no silicon containing moieties), when they are incorporated into device structures (with suitable dopant additions etc) they exhibit the distinctive advantageous properties, that may be seen to derive from the silicon augmented species driving smectic A phases of preferred parameterisation, as discussed above. We can illustrate the difficulty of developing such formulations by providing examples, wherein we can show that although apparently similar approaches may superficially work, the full formulation is required for applications such as those described above (see below).

Displays Containing the Composition

The composition has particular application in displays and the features of the prior art cells and displays, as discussed above, are applicable to contain the composition of the present invention. The overall electrolytic solutions may need to be modified to meet the particular requirements of the specific electronic drive circuits used to address the display in the chosen display configurations, in particular, the balance between clearing and scattering, the relative response times and the display lifetimes all depend on this formulation.

For reflective full colour displays in out-door situations it has typically been difficult to achieve good colour saturation in dyed SmA and such dyes, as have heretofore been available, are not fully stable to external ambient conditions, where solar photo-bleaching limits display longevity. Some of the issues with chromophores have been resolved, based on preferred classes of organic dyes or other colorant approaches. In particular, certain dyes have been selected for their marked resilience in LC phases and very high dichroic contrast coupled to good photo-bleaching resistance. These dyes offer a route to dyed guest-host SmA formulations that are suitable for all but direct sunlit applications (for example in filtered housings, malls, or under canopies, or other means of limiting UV exposure etceteras). Any dye may be used that will orientate itself with the mesogens in the composition and produce different colourations of the composition depending on whether the dyes are aligned perpendicular to the electrodes (when the composition is in an ordered state) or at an angle to them (in a relatively disordered state).

Another issue for true colour rendition in reflective displays is that of pixellation. In a conventional liquid crystal display for video applications, the small picture elements (pixels) are back-illuminated with very bright lights and each pixel is filtered via crossed polarizing elements so that when switched it is on or off. Above each element a red, green or blue colour filter determines what colour is actually shown when the pixel is on, i.e. each pixel switches from black to red, green or blue and the red, green and blue pixels are spatially separated.

If one were to try a similar approach in a reflective colour display with a white background, then the colour would be washed out as every pixel switches between colour and white, so spatially separated colour pixels can only result in heavily de-saturated colours. For a reflective display the need is to use subtractive colour mixing at each pixel so that the additive effect of all the pixels is to provide a good colour rendering of the image with close adherence to colour maps achievable in modest print quality.

This may be achieved in accordance with the present invention, by stacking three pixels which are switchable in colour density in the primary subtractive colours (cyan (red reflected), magenta (green reflected) and yellow (blue reflected)). The ability of smectic A materials to achieve grey-scale in scattering is enabling of this when combined with pleochroic dyes. However, to be viable this requires that, in the summation of coloured layers of the stack, the liquid crystal elements in the stack are able to switch between a clear state and a coloured state that has a reduced level of scattering and preferably minimal scattering (otherwise light will be back-scattered towards the viewer before reaching the lower coloured layers in the stack). The intention is that light passes through one partially coloured subtracting layer, and then through another (etceteras), until impinging on the white reflector and passing back through the stack, creating a full colour gamut at the pixel. We propose, and herein prove, that the scattering in the first two coloured layers may be reduced by decreasing the thickness of liquid crystal layers and (in terms of the liquid formulation) reducing the liquid crystal birefringence (see also Crossland et al in reference P6).

To be applied on glass or plastic substrates, the surface energy and viscosity must be controlled accurately. When filling large area devices such as glass panels it is essential that the material can flow into the aperture and not separate (into its constituent parts) during the filling and spreading out across the full areal extent.

Figure 18:
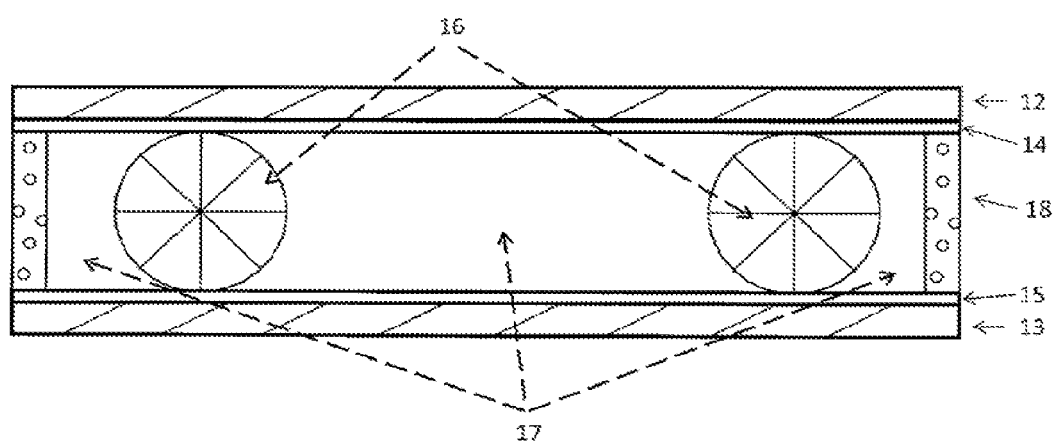
FIG. 18 is a schematic view of a cell shown in cross section.

A schematic cell is shown in FIG. 18. Spacer beads or fibres 16 separate a pair of glass or plastic substrates 12,13 and define the cell thickness. An edge seal 18 is used to retain the liquid crystal composition 17 in the cell. The liquid crystal electro-optic devices of the present invention typically have a cell gap designed to be in the range of 0.5 microns to 10 microns. A transparent conductor layer 14,15, e.g. indium tin oxide, is applied to each of the substrates 12,13 to form electrodes. The lower substrate 13 may be reflective or may emit light in a back-lit display.

EXAMPLE 1 (Comparative)

Side-Chain Liquid Crystal Polysiloxanes (SCLCP) Plus Nematic Mixtures

A mixture of a dispersion side chain liquid crystal polymer (component (d)) may be made by hydrosilation of an alkyl cyano-biphenyl mesogenic moiety. The hydrosilation agent may be, for example a siloxane such as Dow Corning 1107, which is polymethylhydrogensiloxane of the formula:

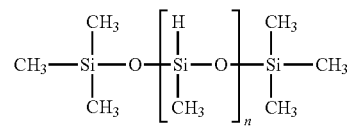

In this case a series of polymers were made by undertaking a hydrosilylation reaction between Dow Corning 1107 (where n in the above formula has an average value of 20) and 4-cyano-4'-n-prop-1-enyloxy biphenyl, to produce form a side-chain liquid crystal polysiloxanes (SCLCP).

A composition was made consisting of:
50% SCLCP, as above (component (d)) and
33% 5CB, 17% 12CB, (components (c)
To this were added:
0.01% Cetyl tri-ammonium bromide (component (b)), and
0.5% 4-dimethylamino-4-nitrostilbene red/orange dye.

Compared to the composition of the present invention, this composition does not include component (a) and is in accordance with the teaching of EP 052 9597 (Sumitomo).

The composition was placed into a test cell having a pair of glass plates having indium tin oxide electrodes spaced apart by 7.5 μm. The best response times at 30° C., using an alternating current with a 100V peak voltage were:

With the application of high frequency, clearing signals (i.e. applied electric field signal to make the composition clear (light transmitting), it took 0.6 seconds (±0.05) at a frequency applied of 1 kHz With application of low frequency, scattering signals (i.e. applied electric field signal to make the composition scattering), it took 12 seconds (±3), at an applied frequency of 0.05 Hz Similar results were obtained for other another 20 DP side chain LCP, 49% SCLCP (component (d))
47% 5CB and 3% 12CB and 1% 9CB (components (c)) together with
0.01% Cetyl tri-ammonium bromide (component (b)), and
0.5% 4-dimethylamino-4-nitrostilbene red/orange dye.

This work also highlighted the ionic stability issues, and in particular the effect of successive switching on response time. A very clear trend was observed, with dramatic increase in response time, 10 s at 5 switches->60 s at only 30 switches. For further details of the test method, see MSc Thesis. M. J. Coles. Dept of Physics and Astronomy, University of Manchester, 1995.

An analysis of these results showed that such SCLCP were not fast enough nor did their other properties suggest a good fit with the applications herein discussed.

Such formulations were deemed wholly inadequate for the applications considered here and are illustrative of the need for a sophisticated design of experiment and much deeper understanding to obtain useable formulations with fast switching, wide operational temperature ranges and stable and long-lived parameters (relative application demands).

EXAMPLE 2 (Comparative)

Short Siloxane Derivatised Mesogens Plus Nematic Mixtures

A formulation of materials based upon the mesogens based upon penta-methyl di-siloxane substituted alkyl-oxy-cyano-biphenyls with pentyl-cyano-biphenyl may be made (see for example ref. Coles et al., J. Phys. D: Appl. Phys. 39 (2006) 4948-4955).

They have been the subject of IP filings (see U.S. Pat. No. 5,547,604 (Coles) and WO2009/111919 (Halation)) and of open literature publications. It has been our experience that cold crystallization of the pentamethyl-di-siloxane-alkyl adduct cyano-biphenyls is a difficult problem to eradicate. The addition of a nematic (component (c)) as a plasticizer does not resolve this issue as at high loadings the temperature suppression of the phase becomes such that it is not useable in such applications as we are discussing. Similarly as a formulation the simple nematic plus siloxane derivatised smectic does not show the full multi-stability desired for gray scale applications. However, we have found that the composition of the present invention has a wider range of operating temperatures without crystallization of the siloxane component (a).

Response times for a representative mixture were also disappointing (at room temperature and at the same fields used in comparative testing), the time to scatter was 1.2 s and the time to clear varied substantially but was generally up to 0.12 s and could be as low as 04 s. This was a pattern of behavior with such mixtures, without additions of other agents the strong asymmetry of the scattering and clearing speeds limited the application merit of such materials. In addition cold crystallization was a persistent issue in some mixtures as was poor upper and lower temperature ranges. Similarly for grey-scale applications there was evidence that the 'rest-states' were not sufficiently stable.

EXAMPLE 3

Short Siloxane Derivatised Mesogens Plus Nematic Mixtures Plus Phase Modification Using Side Chain Liquid Crystal Polysiloxanes (SCLCPolysiloxanes)

The limitations of the above examples above has taught us that the full formulation requires the complementary contributions of the layering, the plasticiser and some mechanism to control the phase's temperature range, conduction anisotropy and scattering texture. The following example shows how that may be achieved, and exemplifies the formulation that is the subject of this invention.

Studies of side chain liquid crystalline polysiloxanes showed that they were complex in their own right. The synthesis of side chain systems required a careful choice of mesogen lithe mesogen (even as a side group) is too long then critical slowing of the switching character occurred. However, if very short pendant species are used the synthetic challenge dramatically affected yield and stability of the systems. To add further complexity it was clear that SCLCPolysiloxanes could be directly formulated into smectic A materials suitable for manufacture in a diversity of device formats, only provided that the correct average degree of polymerisation, DP, was utilised.

Selecting a model system between the limits of mesogen side chain length caused the down-selection of 4OCB as a suitable test case. The average DP of SCLCPolysiloxane was selected after experimental tests to improve the clearing temperature of the formulations without unduly increasing viscosity. This was done on the basis of formulation with the species such as Sit-8OCB (themselves selected for reasons of good properties and acceptable cost and yields). The design of experiment to make a choice of the nematic was based upon applications specifications and availability of the components. In particular a useful temperature range and birefringence were critical selections (sec below). The formulation study selected from the palette of down-selected species and reviewed recursively the evidence for selection criteria.

One of the critical discoveries and selection criteria was the ability of the SCLCPolysiloxane to enable the clearing point of the liquid crystal formulation to be raised while being present at relatively low concentration. A discovery was made that this behaviour had an optimum design point wherein a useful temperature range was achieved at modest loadings. Furthermore a discovery was made that the formulation eliminates the cold crystallisation of the Si8OCB that can be observed with careful thermal history profiling, and would, otherwise, severely limit performance and application of any pure oligosiloxane-mesogen or simple mixture. The discover was also made that the use of Side Chain Liquid Crystal Polysiloxanes in these formulations both sets the domain size and controls the ionic conduction and anisotropy. Thus it was proven that such agents were critical to creating the applications merit of the materials in these applications.

Selection of a test nematic species (component (c)) was done on the basis of availability of certain very well characterised mixtures, Merck/BDH BL003, for example, along with E7 were explored to see how the complexity of commercial mixtures engineered for use in nematic display applications performed within the oligosiloxane templated Smectic A phases. Comparisons between these commercial eutectic mixtures and relatively simple nematic formulations, prepared in-house, led to the elucidation of simplified organic nematic mixtures which were equally able to meet the applications demands of the smectic-A scattering displays.

The combined Sit-8OCB/SCLCPolysiloxane systems are capable of accepting high concentrations of a range of nematic organic species. It was further shown that nematic pre-formulations can readily be designed to impart favoured property profiles (birefringence, viscosity, temperature ranges) in the siloxane formulations. For example, birefringence can be tuned down utilizing 4-(trans-4-pentylcyclohexyl)benzonitrile and similar, component (c) species which do not, themselves, exhibit Smectic A phases, but which have been shown to be compatible with siloxane host systems comprising cyanobiphenyl moieties and similar component (a) species, this being accommodated in the phase-segregated smectic sub-structure.

EXAMPLE 4

Figure 6:
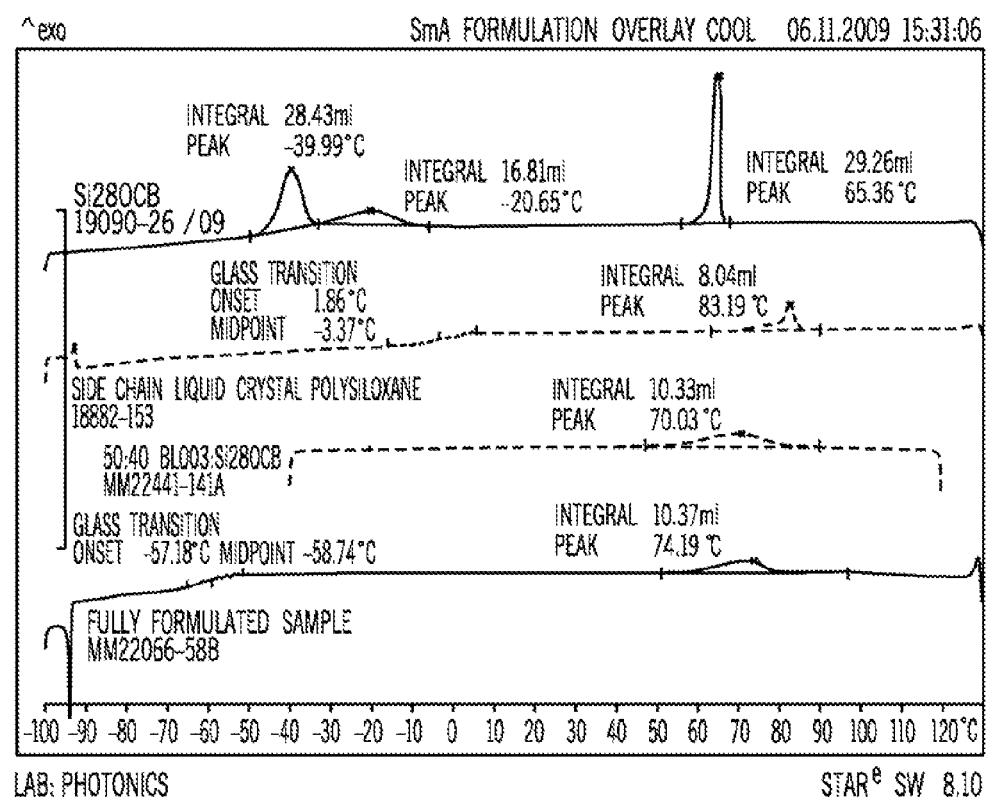
FIG. 6 are Differential Scanning calorimetry (DSC) thermograms for liquid crystalline components and formulations—cooling from the isotropic phase.
Figure 7:
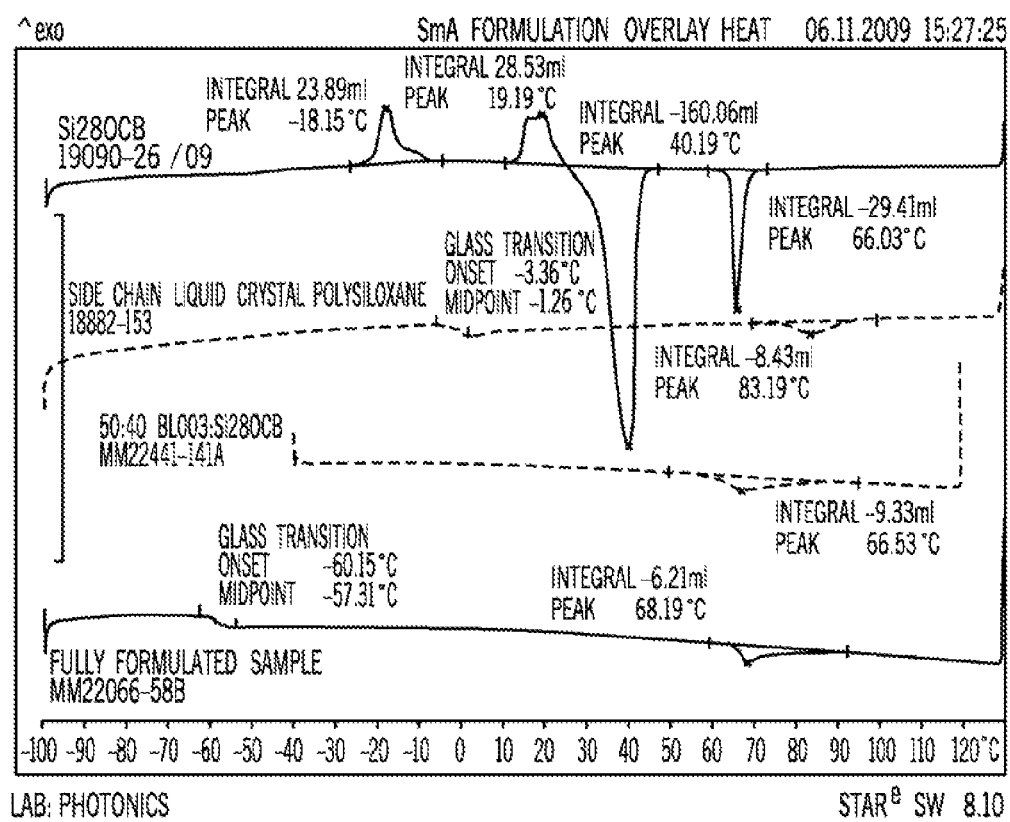
FIG. 7 are further Differential Scanning calorimetry (DSC) thermograms for the same liquid crystalline components and formulations as in FIG. 6—re-heating of the cooled samples.

The differential scanning calorimetry (DSC) thermograms presented in FIGS. 6 and 7 illustrate the influence of the siloxane liquid crystals (component (a)) on the properties of the final formulation of the present invention.

The cooling and heating data (at 10° C./min) for Si2-8OCB alone indicate that while this mesogen forms an excellent host which is capable of creating a smectic layered structural template, it is not a suitable liquid crystal for use in a pure state. When cooled below −10° C. the mesogen forms more ordered phases and when re-heated it undergoes cold crystallization and then melts at 40° C. to reform the SmA phase. Thus the liquid crystal phase is metastable below 40° C. and indeed when the sample is cooled into the SmA phase and then held at room temperature, it slowly crystallizes. This indicates that prior proposals based on the use of component (a) alone, such as U.S. Pat. No. 5,547,604 (Coles) and WO2009/111919 (Halation) do not provide compositions that are commercially acceptable.

The liquid SmA phase of Si2-8OCB can be greatly improved by adding either individual nematic mesogens, or eutectic nematic mixtures (component (c)), such as BL003, which is a composition commercially available from Merck. The DSC data for an Sit-8OCB/BL003 blend reveals that the undesirable low temperature phase behaviour of the Sit-8OCB can be suppressed, allowing the SmA phase to exist down to −40° C., a temperature which represents the lower end of a storage temperature range which would be required for deployment of devices. While this blend has a good phase range it has too low an upper temperature for transition to the isotropic state.

Furthermore, such mixtures have been shown to suffer from poor bistability, or multi-stability; i.e. they tend to relax to an equilibrium state after switching.

The DSC for the Side chain Liquid Crystal Polysiloxane reveals a SmA phase which extends down to −3° C., where the material forms a glassy, layered phase. This indicates that prior proposals based on the use of component (a) without also components (c) and (d), such as U.S. Pat. No. 5,547,604 (Coles) and WO2009/111919 (Halation), do not provide compositions that are commercially acceptable.

The formulation comprising the Si2-8OCB, nematic BL003 and the side chain liquid crystal polysiloxane, i.e. a composition according to the present invention but without the ionic dopant, exhibits a very broad SmA phase with a glass transition below −50° C. and a clearing temperature of >65° C. This formulation exhibits a broad SmA range, multi-stability and response times which are acceptable for the intended applications.

Further examples of such formulations, where the organic nematic mesogens are also selected to enable the tuning of the birefringence of the final formulation are given in Tables 2 and 4 at the end of this document.

The switching speed of representative resultant mixtures has been shown to match the applications described herein and tabulated figures are provided in the following Tables.

| | | Comparative Examples | | | |
|---|---|---|---|---|---|
| Sample | Temperature | Switching time to clear state | Switching lime to scattering state | Applied Field | Reference |
| Si2-1OOCB | 32.7° C. | >10,000 ms | >70 ms | 12 V/μm | Reference A below |
| 6OCB-(Me$_2$SiO)$_5$-6OCB | 35.3° C. | >70,000 ms | >700 ms | 12 V/μm | |
| SCLCPolysiloxane = 49.49% by weight (average DP = 20, grafted mesogen = 3OCB) 5CB = 33% by weight 12CB = 17% by weight CTAB = 0.01% by weight Stilbene dye = 0.5% | 30° C. | 600 ms ± 50 ms | 12,000 ± 300 ms (* rapidly rising to >60,000 ms) | 13.3 V/μm | Reference B |
| 18706sr093 Si28OCB = 44% by weight BL003 = 55.9% by weight CTAB = 0.02% by weight SmA phase range = −63° C. to 59° C. | 24° C. | Not recorded as this sample was not bistable | Not recorded as this sample was not bistable | — | |

\* A significant deterioration in the low frequency response (switch to scattering) was reported, with this response time increasing to >60,000 ms after only 30 switching cycles.

Reference A: "Electro-optic effects in novel siloxane containing oligomeric liquid crystals I: Smectic A materials." Proceedings of SPIE (1995), Volume 2408, Pages 14-21

Reference B: "Electro-optic studies of polymer liquid crystals and their implications for devices". M. J. Coles. MSc. Thesis Dept. of Physics & Astronomy, University of Manchester.

Examples included in this application

| Sample | Temperature | Switching time to clear state | Switching time to scattering state | Applied Field | Comments |
|---|---|---|---|---|---|
| 18706sr093d<br>Si28OCB = 39.5% by weight<br>BL003 = 50.3% by weight<br>CTAB = 0.018% by weight<br>SCLCPolysiloxane =<br>10.1% by weight<br>(average DP = 20,<br>grafted mesogen = 3OCB)<br>SmA phase range = −60° C.<br>to 64° C. | 24° C. | 120 ms | 190 ms | 17 V/μm | |
| MM22066-58A (see Table 2 for composition | 25° C. | 30 ms | 145 ms | 13.3 V/μm | |
| MM22066-58A | 22° C. | 2 ms | 20 ms | 18.6 V/μm | |

Thus it can be seen that the response times of the present invention to both clear and scattering state can be less than 300 ms and values lower than 200 ms have been achieved, even down to 2 ms (clearing) and 20 ms (scattering).

Further compositions in accordance with the present invention are set out in Tables 2 and 4.

The companion choice of Si28OCB was made already partially from the prior work on such species. Other members of the Sit-mOCB homologous series (where m=the number of —CH2- units in the hydrocarbon chain linking the siloxane and the aromatic moiety) may also be suitable.

Figure 8:
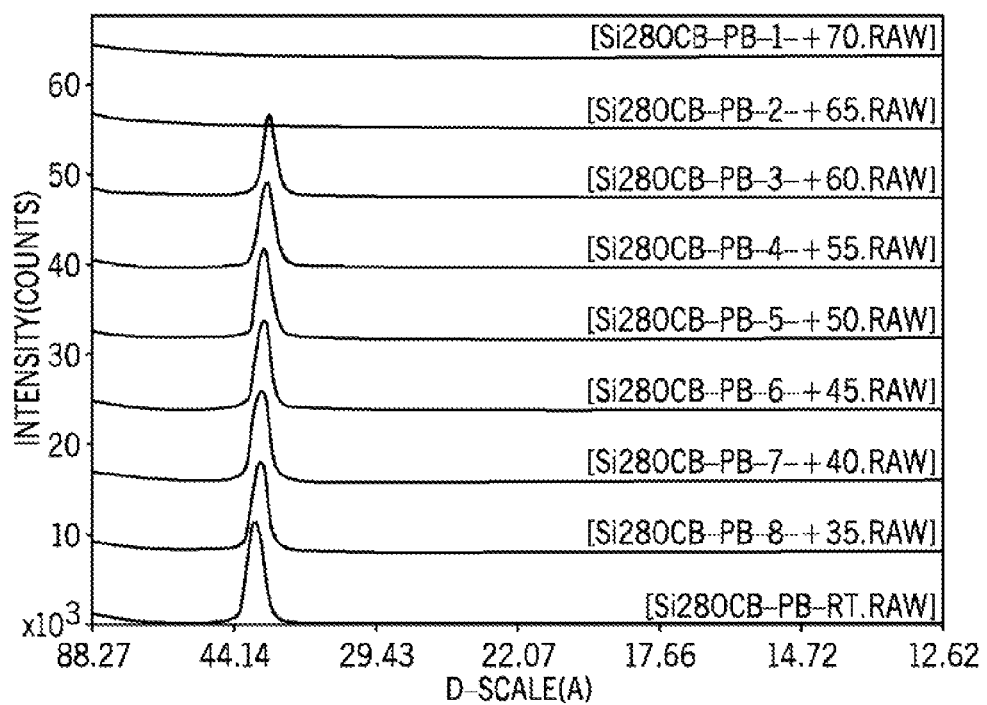
FIGS. 8 and 9 show the small angle X-ray scattering data for: the pure siloxane mesogen; and the same for a formulation with an organic, nematic host and an oligomer.
Figure 9:
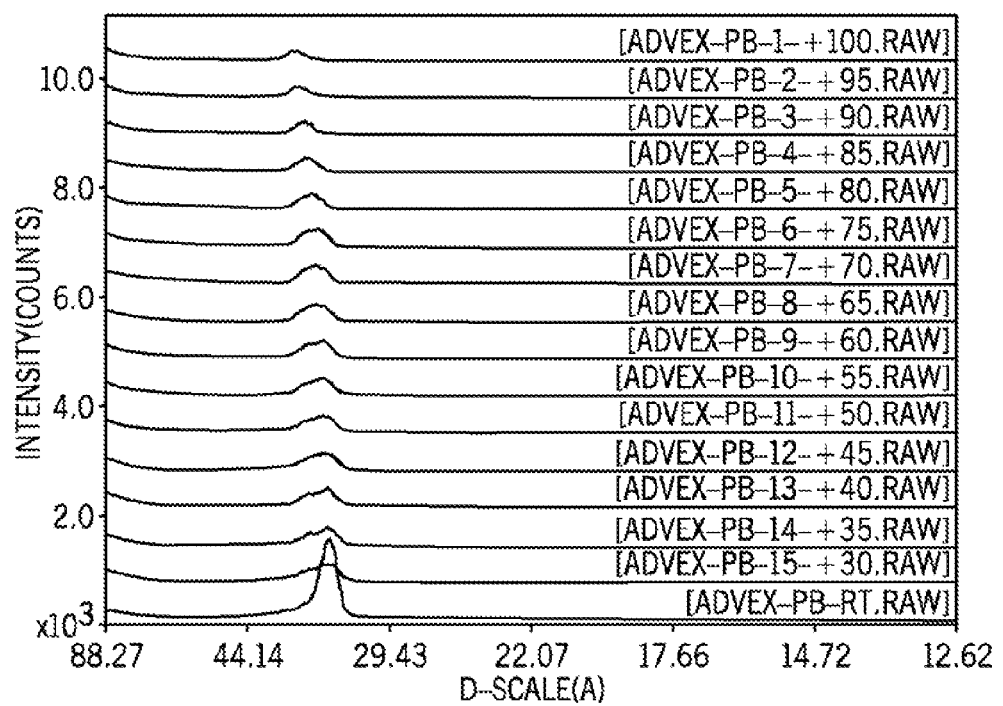

FIGS. 8 and 9 show the small angle X-ray scattering data for: the pure siloxane mesogen; and the same for a formulation with an organic, nematic host and an oligomer.

FIG. 8 shows the strong layer formation observed for (8-(4-cyanobiphen-4-oxy)octyl)pentamethyldisiloxane, Sit-8OCB. Note that "+xx" defines the temperature of the experimental run in ° C.

FIG. 9 shows the layering in a formulated material (composition MM22066-58A) where 50% of the material is formally an organic nematogen, and a further 10% is a polymeric additive. Note that "+xx" defines the temperature of the experimental run in ° C.

The sharp peak in FIG. 8 for Sit-8OCB shows the clear presence of the sublayering described in connection with FIG. 1 within the symmetric layers. If the sublayering were not present, the peak would be much more diffuse. From FIG. 9 for a composition in accordance with the present invention, it can be seen that the sharp peak is still present, indicating the presence of the sublayering also in the composition of the present invention. It is also noteworthy that the sublayer structure remains up to a temperature of 100° C. This clearly illustrates the ability of compositions in accordance with the present invention to provide a material with all of the design attributes required. Moreover it also shows the ability to formulate outside of the bounds taught within the published patent and non-patent literature.

EXAMPLE 5

Advantages of Silicon Augmented SmA Phases Doped with Preferred Ionic Dopants

Conductivity and Conductivity Anisotropy.

The conductivity anisotropy is important in controlling the SDS process (e.g. equation 2 above). The magnitude of the conductivity is important since high conductivities are likely to lead to irreversible electrode reactions and therefore threaten the lifetime of devices.

We have observed that the conductivity of the class of dopants described above may be advantageously lower (for a given dopant concentration) and also that excellent scattering is observed in these materials over longer time periods with lower conductivity solutions compared with non silicon augmented SmA phases.

Figure 10:
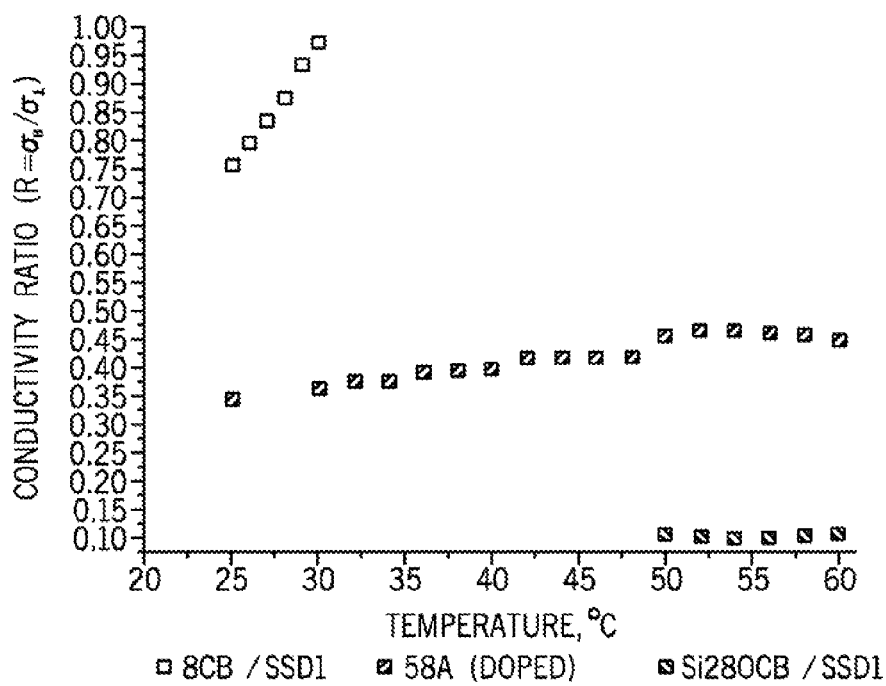
FIG. 10. shows a comparison of conductivity anisotropy for 8CB (top line of dots), pure Si28OCB (bottom line of dots) and a formulation test sample (middle line of dots) according to the present invention.

The ionic conductivity anisotropy for a pure sample of the siloxane derivatised molecule Si28OCB: (8-(4-cyanobiphen-4-oxy)octyl)pentamethyldisiloxane with that of 8CB (4-cyano-4'-n-octylbiphenyl) is contrasted in the experimental data presented in FIG. 10, which shows the comparison of conductivity anisotropy for 8CB (top line of dots), pure Si28OCB (bottom line of dots) and a formulation test sample (middle line of dots, to be discussed further below) according to the present invention.

8CB doped with a preferred dopant SSD1-cetyl trimethyl ammonium perchlorate (top line of dots) shows a conductivity anisotropy that is very modest compared with the silicon augmented materials. The value for Si28OCB is remarkably high. This extreme behaviour has only been observed to occur in single component Siloxane mesogens, and not yet seen in formulations involving complex mixtures.

In general we have observed that silicon augmented SmA phases doped with the appropriate ionic materials to induce scattering e.g. at concentrations of 100 to 200 ppm, tend to have a lower conductivity and a higher conductivity anisotropy. The former property is helpful in prolonging the lifetime of electrically switched devices, since it minimises potential problems regarding the reversibility of the electrode reactions during the passage of current and due to degradation of the dopant. The enhanced conductivity anisotropy is likely to be another consequence of the micro-phase segregation described in FIG. 1 that is forcing the formation of smectic layering in these materials. High values reduce the electrical scattering threshold as suggested by equation 3.

Dielectric Anisotropy in Silicon Augmented Smectic A Phases.

The performance of smectic dynamic scattering (SDS) devices is presumptive of achieving a good dielectric anisotropy (and a higher absolute value of the dielectric constant parallel to the molecular long axis in the smectic A phase).

Achieving a higher dielectric anisotropy in the silicon derivatised molecules is possible by selecting more polarisable core molecules. However, there are serious considerations to be made if adopting such an approach. It is intrinsic to the layering process described above in connection with FIG. 1 that the phase partitioning occurs and that this leads to strong conductivity anisotropy. Contrary to this gain however, the siloxane is relatively weakly polarisable and has the effect of diluting the magnitude of the dielectric constant. From our long study of silicon mesogens we, and other investigators, have studied the role of the balance between the moieties in so called AB molecules and in related ABA oligosiloxane-liquid crystal hybrid systems (where B is the oligosiloxane and A is a mesogen). A pertinent conclusion of those studies is that molecular packing is critical to sustaining phase partitioning and good liquid crystalline properties, in effect a molecular packing problem (see for example: Coles H. J. et al and Tschierske C., ref 10).

The ability to synthesise siloxane modified molecules of high longitudinal dielectric constant is fairly readily achieved, but the gain versus liquid crystalline properties is constrained. The nature of molecular polarisability is that it scales with improved electron delocalization in extended aromatic chains and also with charge transfer character in such molecular systems. However, this is also what brings strong colour to a molecule (c.f. dye-stuffs). Another factor is the reliability, and very strongly polarisable species are very prone to chemical degradation through oxidative mechanisms and through chemical interactions. From a synthetic perspective the yield of reaction and synthetic complexity strongly suggests that development of siloxane modified, very highly polarisable, pure molecular SmA materials is not commercially viable in the applications herein proposed. However, using the formulation approach herein presented we can significantly enhance properties without using 'extreme' chemistries.

Scattering Intensity.

The requisite metrics to achieve the scattering texture required for either brightly reflecting scattering texture (or alternatively a translucent scattering texture) are, 1. the mesogen formulation's refractive index and anisotropy, and,
2. the length scales and distribution in the textures developed under ionic scattering driven by selected drive schemes.

Figure 11:
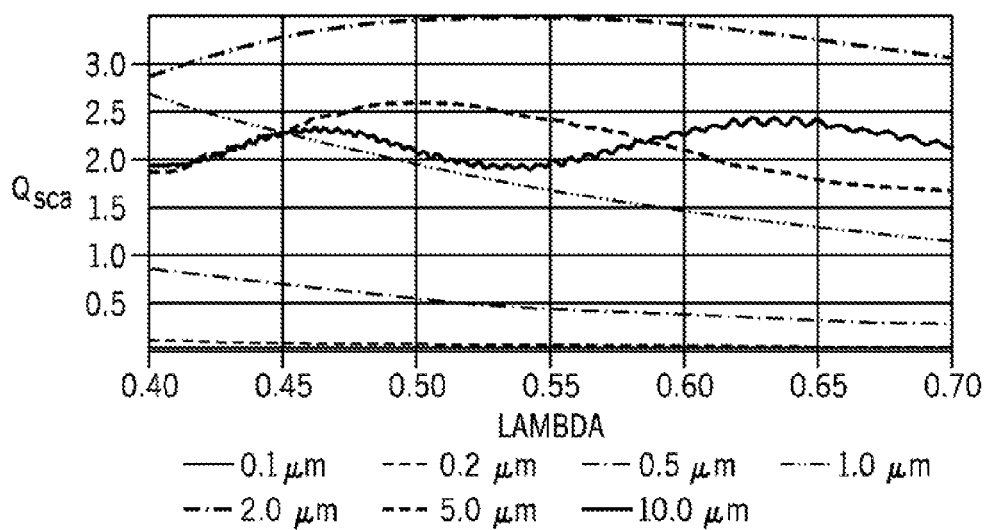
FIG. 11 shows the theoretical scattering efficiency of particles of different dimensions, treated as spheres.

FIG. 11 shows the theoretical scattering efficiency of particles of different dimensions, treated as spheres of diameters shown, where lamda=wavelength in microns The plots are for particles having the following dimensions, identified by their values at lambda 0.4 and starting from the top: 2.0 µm, 1.0 µm, 10.0 µm (wavy line), 5.0 µm, 0.3 µm and 0.2 µm.

Figure 12:
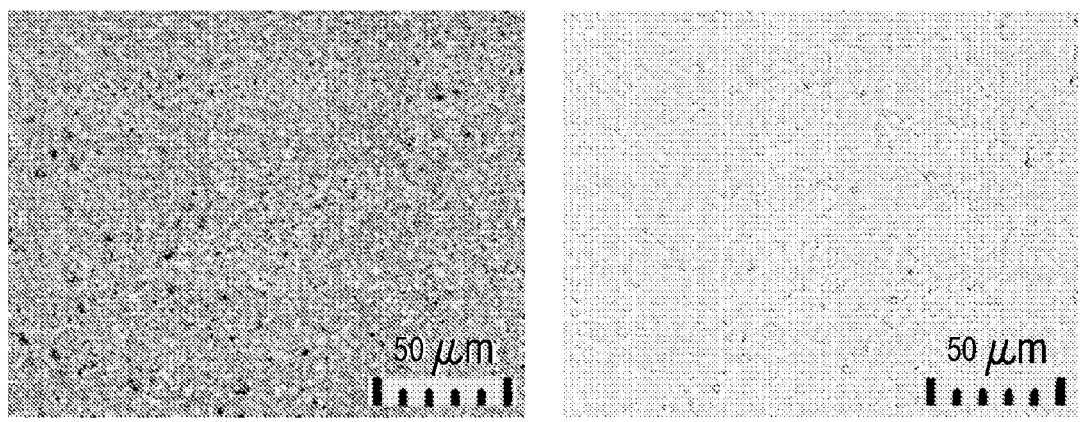
FIG. 12 shows the formulated smectic A scattering texture of the composition in accordance with the present invention in scattered state and translucent state.

FIG. 12 shows the formulated smectic A scattering texture of the composition in accordance with the present invention in scattered state and translucent state, illustrating the uniform texture and the scale which spans a few micrometres down to <0.5 micrometre. This gives an exceptionally flat and un-coloured white scattering.

This scattering texture is the product of the ionic electro-hydrodynamic vortices effect upon the layered mesogen. In this case driving a very fine texture development due, in part, to the effective elastic tensor and its interplay via the conductivity anisotropy that creates very short range ionic paths before the structure is disrupted. The fine structure developed is evident in the pictures of FIG. 12; however, FIG. 13 shows how the consequence of this is to create a paper-like scattering whose metrics are superior to that of other contemporary reflective display offerings (such as e-ink).

Figure 13:
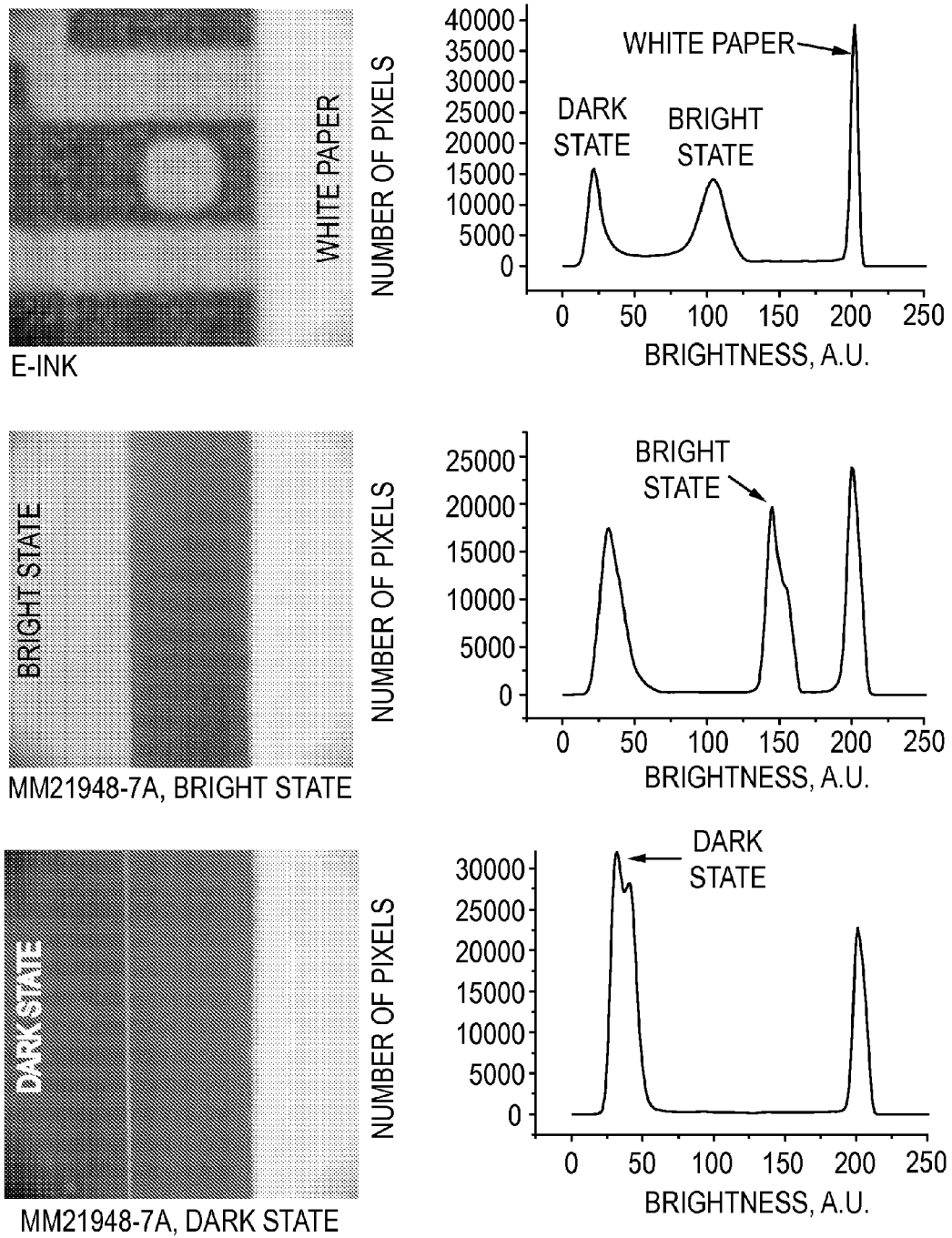
FIG. 13 shows the scattering texture measurements and direct comparative brightness measured through an identical optical system for each of a powder electro-phoretic material, white paper and a formulated smectic A liquid Crystals according to the present invention.

In FIG. 13 we see the realization of the display metric promised by the formulation MM21948-7A which has a composition in accordance with the present invention that is equivalent to composition MM22066-58A (see Table 2). FIG. 13, shows the scattering texture measurements, direct comparative brightness measured through an identical optical system for each of a powder electro-phoretic material, white paper and a formulated smectic A liquid Crystals (after the present invention), i.e. an advantage of these formulations is that they scatter efficiently, with a finer scattering texture than that found with non siloxane based materials, e.g. the typical organic mesogens.

A comparison between the brightness and contrast of prior art e-ink and composition DC-HBF according to the present invention is as follows:

|  | e-ink (Motorola F3) | SmA (MM21948-7A) |
|---|---|---|
| Brightness | 52% of white paper | 72% of white paper |
| Contrast | 6:1 | 6:1 |

Device Uniformity

Silicon augmented SmA electrolytes of the present invention described above have the property that they modify the internal glass/indium-tin oxide surfaces of the liquid crystal cells by blocking access to at least the more reactive surface adsorption sites.

This is dramatically apparent when cells are being filled with liquid crystal formulations using the preferred dopants (e.g. myristyl or cetyl trimethyl ammonium perchlorate) in the fabrication of SDS devices:

With conventional SmA hosts it is observed that as the liquid crystal formulation flows into the cell through the filling aperture and then spreads out to fill the cell gap, then dopants tend to be adsorbed onto the clean interior surfaces of the cell (the process is similar to that occurring in chromatography). Close to the filling hole dopant is adsorbed onto the glass (where it promotes homeotropic alignment and the clear state). Away from the filling aperture the dopant concentration is greatly reduced, so initially scattering may not be possible.

These problems are important issues in the fabrication and manufacture of SDS devices. They can be overcome by the use of an initial "burn-in" process, wherein cells are continuously operated using electrical waveforms designed to cause alternate scattering and clearing. In time uniformity can be established (e.g. in display cells up to A4 in size). However this is a considerable inconvenience and extra cost in fabrication.

These effects are dramatically reduced when using silicon augmented SmA phases as opposed to conventional organic SmA phases. Devices fabricated up-to-date using compositions of the present invention in sizes to 10×10 cm are highly uniform and operate immediately after filling with no necessity for burn in.

Enhanced Lifetime

The conflict implicit between the need for stable layering, leading to strong conductivity anisotropy, and the maintenance of good switching characteristics suggests that complementary development of both the ionic scattering and the mesogenic system is essential. From the literature it is also well known that ionic decomposition is also one of the principal failure modes in the dynamic scattering-mode devices.

In the electrical addressing of SDS devices the low frequency waveforms that cause scattering are usually applied to the whole display panel for a period of milliseconds or tens of milliseconds. This sets up a 'blank page', onto which the information can be written (line-at-time) by dielectric re-orientation using a higher frequency waveform.

The power consumption is very low because electrical waveforms need only be applied whilst the information being written as a result of the bi (or multi-) stability of the composition of the present invention in the ordered (clear) and disordered (scattering) states.

In general the lifetime depends on changes in the scattering conditions. The current flowing during the brief tenure of the scattering pulse is a key factor.

The lifetime can be measured in terms of the number of scatter and clear operations that the device can sustain, since between such operations the device is stable for any period of time. The number of such cycles can be considered as the number of pages of information that can be presented on a display, or the number of times a window panel can be switched.

Here we assume that our preferred dopants myristyl- or cetyl-trimethylammonium perchlorate are used such that we have anions that will not be oxidised (unlike the commonly used bromide ion) and efficient (e.g. myristyl- or cetyl-trimethylammonium) scattering cations. We also assume that the devices are being properly driven with carefully DC balanced waveforms to avoid unnecessary electrolytic degradations. This means that scattering and clear waveforms are AC waveforms with very little DC content and that the low frequency scatter-waveform always starts and finishes at a zero transition.

Under these circumstances, the failure mode of SDS devices is usually failure to scatter uniformly following depletion of the ionic dopant (especially the scattering cation). This results in partial scattering and lack of uniformity. One substantial contribution toward this process is the occurrence of non-reversible reaction at the electrodes; another is adsorption of ions on the interior surfaces of the liquid crystal cells in which the formulation is contained.

The scattering is also considered to be inadequate if it will not withstand the continuous application of the waveform used to clear the scattering (e.g. a 2 to 10 KHz square wave) with one third of the peak voltage actually used for scattering. This is because in electrically addressing large arrays of pixels row-at-a-time with the clear waveform, this error voltage appears on all the pixels during all of the time period during which a page is being addressed.

Silicon augmented SmA phases have been observed to have a life time (measured in the number of clear to scattering switching operations, which corresponds to the number of pages on information switched) that can be close to an order of magnitude longer than the best figures we have observed with organic Sma materials. Some of the reasons for this appear to be:
  a) Adsorption of scattering cations on the interior surfaces of SDS devices is minimised, almost certainly due to the blocking of active sites on the surface by the siloxane moieties.
  b) The blocking of active sites may well help in ensuring the reversibility of surface reactions,
  c) The average conductivity in these smectic phases tends to be low compared with organic smectic A phases. They also produce better scattering at lower currents.

Figure 14:
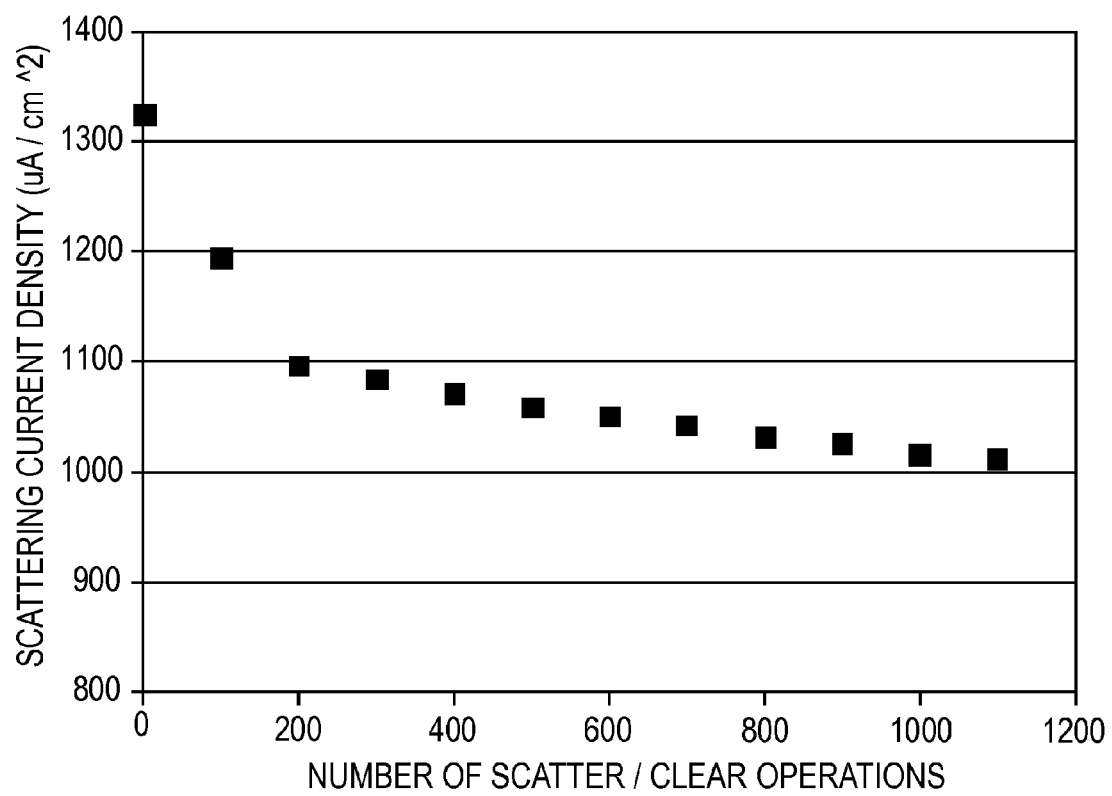
FIG. 14. is a graph for a silicon augmented SmA formulation MM22066-58B doped with 300 ppm of hexadecyl trimethyl ammonium perchlorate.

Further to the degradation question, some measurements of electrical current during the scattering pulse versus the number of switching operations are shown in FIG. 14 for a silicon augmented SmA formulation MM22066-58B (see Table 2 for composition) doped with 300 ppm of hexadecyl trimethyl ammonium perchlorate.

Initially currents are high (>1 mA per $cm^2$) due to the presence of spurious impurity ions in the mixture which are quickly removed by the passage of current. It can be seen that after an initial drop the current steadies and proceeds to progressively fall more slowly. A measurement of the same cell after $3.5 \times 10^6$ operations showed the current density to have fallen to 278 $\mu A/cm^2$. It was still scattering and clearing very uniformly at 140V (RMS).

Cells of this type have shown good uniform scattering out to approaching $20 \times 10^6$ operations. They continue to scatter uniformly with currents densities below 180 micro amps per cm sq and have shown life times close to $20 \times 10^6$ operations. After impurity and contaminant ions have been electrolytically removed the scattering current remains 200 micro amps per cm sq over 20 million operations and the scattering threshold and uniformity remain excellent.

Under comparable conditions wholly organic smectic A phases, e.g. mixtures of 8CB and 8OCB show initially higher current densities (several milliamps per cm sq) and fall faster. They also cease to scatter uniformly at higher currents. Carefully formulated mixtures (of these typical organic materials), with the same dopants, need redox protection of the liquid crystals and other measures to achieve life times of $2 \times 10^6$ operations. They also need to be burnt-in for several 1000 operations to set-up and ensure uniform scattering, which is an illustration of burn-in and initial decay of ionic current for a wholly organic mesogen mixture (i.e. component (c) of the composition of the present invention) and the same ionic species (hexadecyl trimethyl ammonium perchlorate).

In the recent literature cetyl-ammonium bromide has been used in formulations (Coles H. J. et al. ref 7) wherein it is stated that reliable operation with low $\alpha$-field scattering is "impossible". In our tests this dopant fails in less than $10^4$ operations due to the oxidation of the bromide ion to bromine. Substituting this with a perchlorate anion (and using either myristyl or hexadecyl (a.k.a cetyl)trimethyl ammonium cations results is exceptional life-times (more than $10^7$ operations) for silicon augmented SmA phases.

The clear difference between organic and silicon containing host phases is also illustrated below by applying triangular waveforms (+ or −140V) to devices after varying numbers of scatter and clear operations in life tests.

Figure 15:
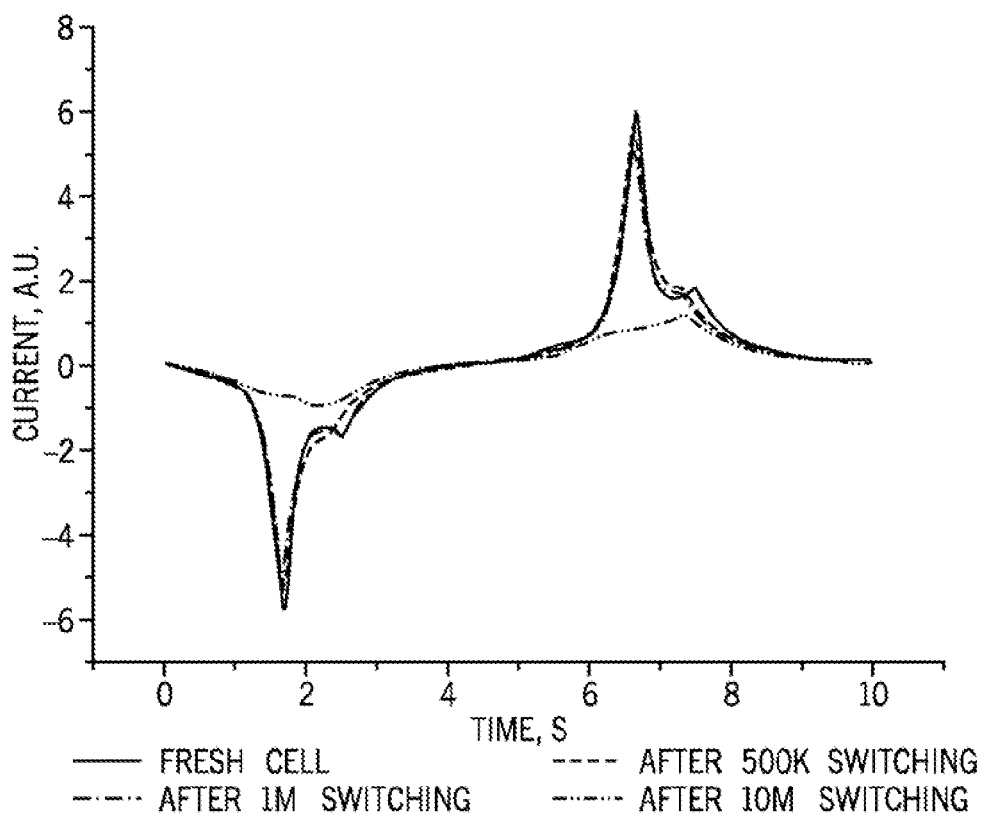
FIG. 15 is a cyclic field addressing (voltammetry) depiction of an accelerated aging of a formulated SmA (as per this invention) showing consistent operation over in excess of (Million cycles.
Figure 16:
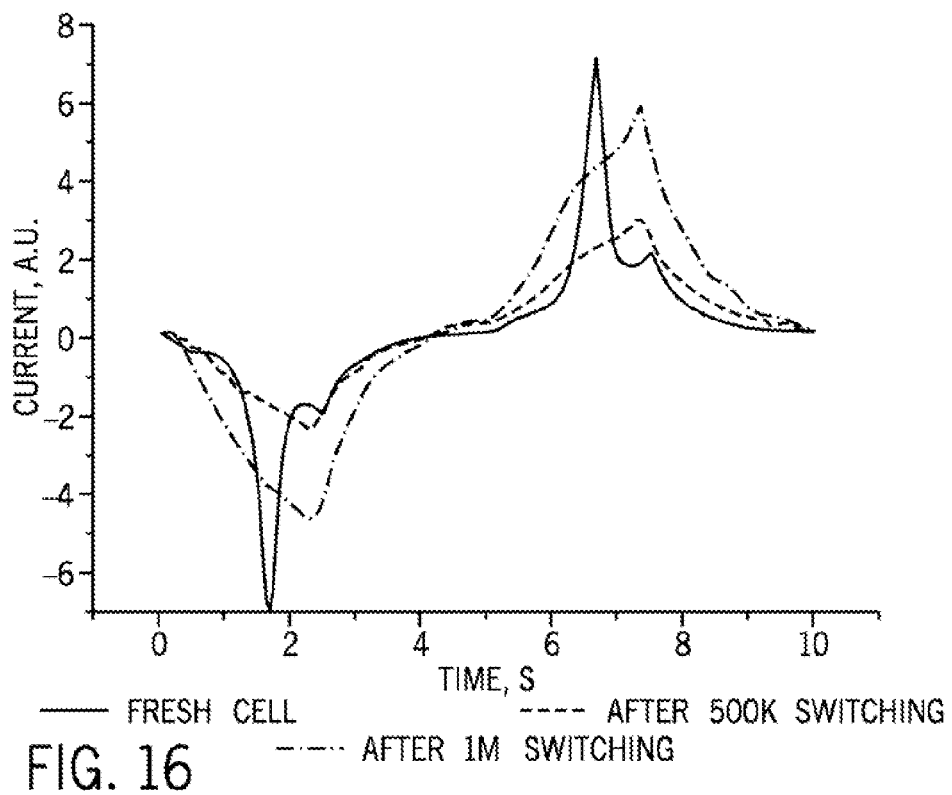
FIG. 16 is similar to FIG. 15 but using the organic smectic, 8OCB using the same ionic dopant used in the formulation of FIG. 15).

FIGS. 15 and 16 show comparative accelerated ageing curves for ionic doped smectic A materials, in these examples a formulated siloxane augmented smectic A system in accordance with the present invention is compared with the (very similar mesogenic moiety) organic 8OCB. The enhanced lifetime of the composition of the present invention (FIG. 15) as against a known 8OCB system is evident.

FIG. 15 shows cyclic field addressing (voltammetry) depiction of an accelerated aging of a formulated SmA (as per this invention) showing consistent operation over in excess of 1 Million cycles. In contrast, in the FIG. 16 the cyclic voltammetry depiction of organic smectic, 8OCB (closely related to the Si28OCB and using the same ionic dopant used in the formulation of FIG. 15), shows the classical signatures of electrolytic decomposition. Comparing the two sets of curves we see a tendency in the siloxane based formulation for the ionic species to be consistent with no broadening of the peak ion, nor shifts of the baseline slope indicative of degradation. This suggests that there is superior reversibility of the electrode reactions in the present formulation than for 8OCB alone. In addition, we have shown that the use of a quaternary ammonium ion with a perchlorate anion provides a greater lifetime than the corresponding bromide anion.

Formulations for Stacked Liquid Crystal Colour Cells.

The development of these formulations also allows the subtractive coloured display modes to be realized via a stacked liquid crystal cell structure. Herein the ability to reduce refractive index contrast (birefringence) may be employed to turn down the scattering in the disrupted state so that the material remains translucent in the partially scattered state and allows underlying colour to be mixed with the transmitted beam via subtractive colour mixing. This would use pleochroic dyes in the formulation of each layer of a three-stack of elements. To allow the coloration to work the stack may use complementary colours, which can provide access to a full colour gamut. Addition of black (K) is desirable in certain applications; the coloration using dyes may be done in combination with coloured back-planes, and other practices known to those skilled in the art, to yield a coloured reflective display or, alternatively, a lit display to provide the performance required in diverse applications. For example, the standard complementary colours cyan, magenta and yellow layers may be used, optionally with a black layer, And provide good brightness.

Figure 17:
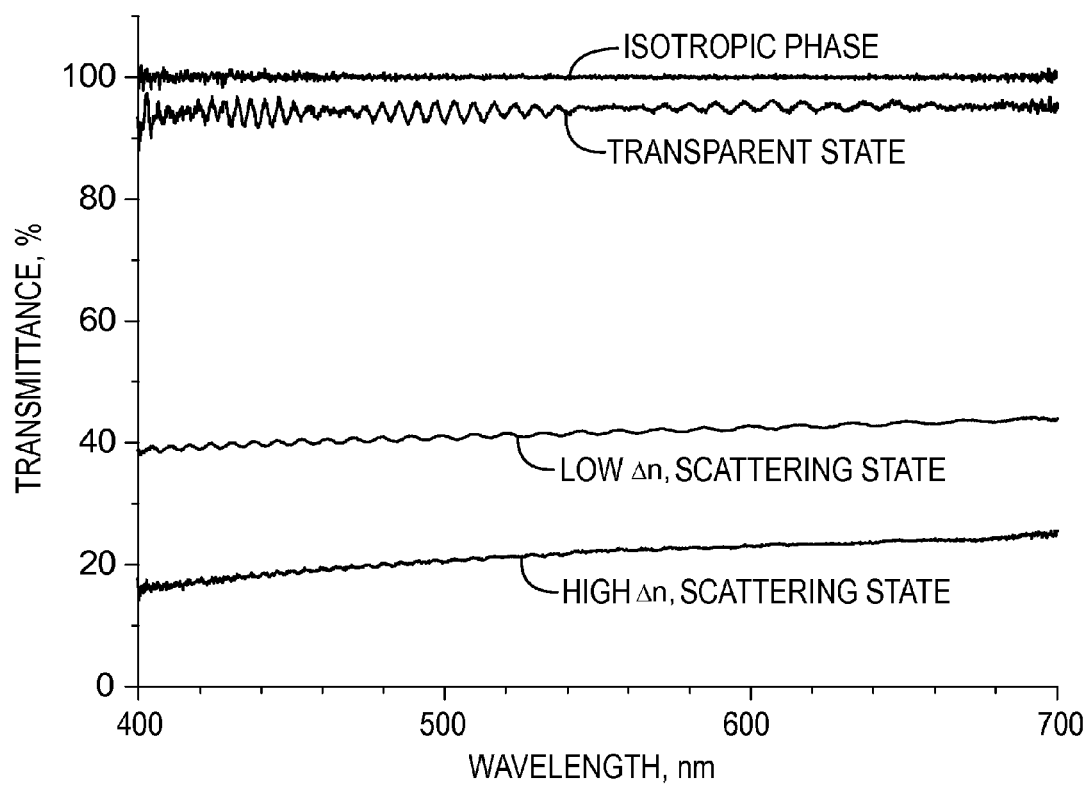
FIG. 17 is a graph of the transmittance of a high birefringence composition (top 3 plots) and a composition whose refractive index has been reduced substantially.

FIG. 17 is a graph illustrating a simple example of a formulation where the refractive index has been reduced substantially to allow demonstration of this principle. In this figure the transmittance is shown of a smectic liquid crystal cell, 12 µm thick, filled with MM22066-142C (see Table 2 for the composition) in isotropic (top line), transparent (line 2nd from the top) and scattering (line 2nd from the bottom) state. The isotropic state of this composition MM22066-142C was used as a reference. The corresponding transmission of the scattering state of a similar cell filled with a low birefringence composition MM22268-30A (bottom line) (see Table 4 for the composition) is also shown. The contrast between the low birefringence composition (bottom line) and the higher birefringence formulation (line 2nd from the bottom) is clear. This ability to formulate across a range of application needs without the need to develop new molecular systems is very attractive from a manufacturing perspective.

The composition, as claimed in claim 1, includes components (a) to (d); it also optionally includes:
a dichroic dye or emissive dye (component (e)—see claim 8
a viscosity-adjusting solvent or diluent (component (f)—see claim 9
at least one molecule e.g. a lathe-shaped molecule, that is not a liquid crystal, but which can be incorporated into the formulation, without degrading the smectic A layer quality or structure of the composition (component (g)—see claim 10), and
up to 50% by weight of a birefringence-altering additive (component (h)—see claim 12.
Low birefringence compositions are set out in Table 4.

Range of the Components in the Composition of the Present Invention

The broad range of the amounts of these components in wt % are set out in the claims and in the table below; the table additionally sets out narrower ranges; the limits of each range for any of the components can be combined with the limits of any other range for the same component and the ranges of any component in the composition set out below are independent of the amounts of the other components, except where stated:

| Component | | Broad range | Narrower range 1 | Narrower range 2 | Narrower range 3 |
|---|---|---|---|---|---|
| Siloxane of formula 1 | (a) | 25-75 | 35-60 | 40-5560 | |
| Quaternary ammonium salt of formula II | (b) | 0.001-1 | 0.01-0.5 | 0.015-0.1 | 0.015-0.05 |
| Polarisable linear molecule of formula III | (c) | 20-65 | 35-60 | 45-55 | |
| Side chain LC siloxane of Formula IV | (d) | 2-25 | 2-20 | 5-20 | 7-15 |
| Dichroic or emissive dye | (e) | 0-10 | 12-8 | 1-6 | |
| Viscosity adjusting solvent or diluent | (f) | 0-10 | 1-8 | 2-6 | |
| Molecule that does not alter smectic A structure | (g) | 0-10 | 1-8 | 4-6 | |
| birefringence-altering additive | (h) | 0-50 | 10-40 | 20-30 | |
| combined amount of components (c) and (h) | | 20-73 | 35-73 | 40-65 | 45-60 |

The present invention also provides a composition with a novel dopant in the form of a quaternary ammonium salt of the general formula VI (see claim 29). The amounts of the dopant in the composition of claim 29 may be 0.001-1 wt %, e.g. 0.01-0.5 wt % or 0.05-0.1 wt %.

The manufacture of the compounds used to make the composition of the present invention is well-known in the literature of the liquid crystal art. For example:
Oligosiloxanes (component (a): A basic synthesis is given for example materials in the literature, for example our publication: J. Materials Chemistry, 1994, 4(6), 869-874.
SCLCPs (component (d)): The synthetics routes has been described in the literature and are obvious to those skilled in the art, when linked with the reference above and also:
Investigations on liquid crystalline polysiloxanes, I. Synthesis and characterization of linear polymers. Finkelmann, Heino; Rehage, Guenther. Phys.-Chem. Inst., Tech. Univ. Clausthal, Clausthal-Zellerfeld, Fed. Rep. Ger. Makromolekulare Chemie, Rapid Communications (1980), 1(1), 31-4.
Preparation of liquid-crystalline polysiloxanes with terminal cyano groups in the side chains. Gray, George W.; Lacey, David; Nestor, Gary; White, Michael S. Makromolekulare Chemie, Rapid Communications (1986), 7(2), 71-6.
Organic Ionic dopants (component (b): are commercially available
Siloxane modified Ionic dopants (component (b): their synthesis is straightforward to a skilled LC chemist.
Organic liquid crystals (component c): are commercially available, or have been described in the literature
Dichroic dyes: these are commercially available.

Likewise the arrangement of the electrodes and the electrical circuits necessary to drive a display containing the composition of the present invention are the same as those well known in the field of displays and it is not necessary to give further detail here.

REFERENCES (THE CONTENTS OF WHICH ARE INCORPORATED BY REFERENCE)

1 'Electrically Induced Scattering Textures in Smectic A Phases and their Electrical Reversal' W. A. Crossland, D. Coates, J. H. Morrissey, B. Needham Annales de Physique, Vol. 3, No. 2-4, pp 325. 1978
2 'Electrically Induced Scattering Textures in Smectic A Phases and their Electrical Reversal' D. Coates, W. A. Crossland, J. H. Morrissey, B. Needham J. Phys. D (Applied Phys), Vol. 11, pl, 1978
3 'An evaluation of smectic dynamic scattering for high complexity displays with on-screen memory' W. A. Crossland, P. J. Ayliffe Proc. SID, 23, (1), 1982
4 'Dielectric and Conductivity Studies of Smectic A Materials towards improved Dynamic Scattering Display Characteristics' D. Coates, A B Davey and C. J. Walker, Proceedings of Eurodisplay, pp 96-99, 1987
5 'A novel approach to flat screen displays: An electrically addressed smectic storage device' W. A. Crossland, S. Cantor Proc. SID Int. Symp, Orlando Fla., Digest of Technical Papers, 124-127, 1985 'Electrically addressed Smectic storage device for large flat panel displays' W. A. Crossland, S. Cantor Electrical communications, 60, (1), 87*93, 1986 'Large panel displays using smectic memory LCDs' W. A. Crossland, S. Cantor Electrical engineering 35, August 1985
6 A variable tilt SmA electro-optic effect giving stored colours', D. Coates, W. A. Crossland, J. H. Morrissey, B. Needham, Mol. Cryst & Liq. Cryst., Vol. 41 (Letters), pp 151-154, 1978
7 Coles H. J. et al.; J. Phys D., Appl. Phys., 40, 977-, 2007
8 J. A. Geurst and W. J. A. Goosens, Phys. Lett., 41a, 369, 1972
9) 'The Physics of Liquid Crystals', P G de Gennes, Clarenon Pres, 1974. 'Liquid Crystal Devcices', Blinov and Chigrinov
10) Coles H J et al; 869, J. Mat. Chem., 4, 869, 1994
11) Coles M., Electro-optic studies of polymer liquid crystal systems and their implications for devices" MSc Thesis. M. J. Coles. Dept of Physics and Astronomy, University of Manchester, 1995
12) Tschierske C., J. Mat. Chem., 8, 1485, 1998
13) Dias, Felix B. et alia, "Ionic conduction of lithium and magnesium salts within laminar arrays in a smectic liquid-crystal polymer electrolyte", Journal of the Chemical Society, Faraday Transactions, 92(14), 2599-2606, 1996.
14) L. Brunsveld et alia, "The Influence of Lithium Perchlorate on Discotic Liquid Crystals and the Ion Conduction of their Mixtures", Molecular Crystals Liquid Crystals, Vol. 331. pp. 449-456, 1999.
15) Blinov L. M. and Chrinov V. G.; "Electro-Optic Effects in Liquid Crystal Materials"; Springer Verlag; 1994

REFERENCE LIST OF PATENTS (THE CONTENTS OF WHICH ARE INCORPORATED BY REFERENCE)

P1 'Method for Preparing and Operating a Smectic Liquid Crystal display Cell having Infinite Storage Properties', W. A. Crossland et al., U.S. Pat. No. 4,139,273, filed 1976
P2 'Co-ordinate Addressing of Smectic Display cells', W. A. Crossland et al., U.S. Pat. No. 4,419,664, filed 1980
P3 'Addressing Smectic Displays', P. J. Ayliffe, U.S. Pat. No. 4,703,305, filed 1985
P4 'Liquid crystal Display Incorporating Positive and Negative Smectic Material', W. A. Crossland, J. H. Morrissey, D. Coates, U.S. Pat. No. 4,291,948, filed 1978
P5 'Smectic A Colour Displays', W A Crossland, A B Davey, Gang Sun, C Dixon, PCT/GB 2005/003705 MO 2006/035213 A2, Priority Date 28 Sep. 2004
P6 WO2006/035213 (Crossland et al)
P7 Coles, Hannington et al., U.S. Pat. Nos. 5,455,697A and 5,547,604A
P8 'Liquid Crystal Dopants', Netland, K. et al., EP 1 537 190 B1

Tables

TABLE 1

High Birefringence Nematic Pre-Formulations (component (c))

| Formulation Reference | Composition (wt %) | DSC Data (10 C./min Heating) Trans Temp (Enthalpy J/g) |
|---|---|---|
| MM22066-79B DCHB Additive 1 | 11.6% 2-CB 11.6% 3-OCB 49.4% 5-CB 15.8% 5-CCB 11.6% 5-CT | N→ -19.6 cCr →6.6 →N→ 101.9(-3.7)→I |
| MM22066-152A DCHB Additive 3A | 8.0% 2-CB 8.0% 3-OCB 53.3% 5-CB 10.8% 5-CCB 13.9% 5-CT | Cr→24.4 C.→N→97.6(-3.9)→>I |
| MM22199-41A DCHB Additive 3B | 8.0% 2-CB 8.0% 3-OCB 59.3% 5-CB 10.8% 5-CCB 13.9% 5-CT | Cr→21.8 C.→N→95.0(-3.0)→I |
| MM22066-152B DCHB Additive 4 | 11.6% 2-CB 11.6% 3-OCB 49.4% 5-CB 10.8% 5-CCB 15.6% 5-CT | Cr→25.9 C.→N→97.7(-2.7)*→I |
| Merck BL003 | | Cr → <-40 C. → N → 106.8(-1.3)* → I |

TABLE 2

High Birefringence Smectic A formulations

| Formulation Reference | Composition (wt %) | DSC Data (10 C./min cooling) Trans Temp (Enthalpy J/g) |
|---|---|---|
| 19277sr011b, A02sr | 50% BL003 40% $Si_2 8OCB$ 10% HMWS 0.04% CTAB | (H) $T_g$→-60.8 C.→SmA→ 64.8(-3.7)→I |
| MM22066-58A | 50% BL003 40% $Si_2 8OCB$ 10% HMWS 0.04% HTAP | (H) $T_g$→ <-40 C. →SmA→ 69.5(-4.0)→I |
| MM22066-58B | 50% BL003 40% $Si_2 8OCB$ 10% HMWS | (H) $T_g$→ <-40 C. →SmA→ 66.9(-4.2)→I |
| MM22066-130C | 59.4% DCHB Additive 1 32.2% $Si_2 8OCB$ 8.0% HMWS | (H) $T_g$→ <-40 C. → SmA→ 65.1(-1.1)→ N→72.6(-2.4)→I |
| MM22066-142A DCHB Form 1 | 50% DCHB Additive 1 40% $Si_2 8OCB$ 10% HMWS | (H) $T_g$→ <-40 C. →SmA→ 68.4(-4.5) →I |
| MM22066-142C DCHB Form 1 | 50% DCHB Additive 1 40% $Si_2 8OCB$ 10% HMWS | (H) $T_g$→ <-40 C. →SmA→ 71.0(-8.5)*→I |

TABLE 2-continued

High Birefringence Smectic A formulations

| Formulation Reference | Composition (wt %) | DSC Data (10 C./min cooling) Trans Temp (Enthalpy J/g) |
|---|---|---|
| MM22199-113C DCHB Form 1 + HTAP | 50% DCHB Additive 1 40% Si$_2$8OCB 10% HMWS 0.04% HTAP | (H) T$_g$→ <−40 C. →SmA→ 68.4(−4.1)→I |
| MM22066-142B DCHB Form 2 | 50% 5-CT 40% Si$_2$8OCB 10% HMWS | (H) SmY→51.2(0.3)→cCr→ 88.6(−7.6)→SmA→ 148.4(−7.3)→I |
| MM22199-41B DCHB Form 3A | 50% DCHB Additive 3A 40% Si$_2$8OCB 10% HMWS | (H) T$_g$→ <−40 C. →SmA→ 67.9 (−4.5)→I |
| MM22199-41C DCHB Form 3B | 50% DCHB Additive 3B 40% Si$_2$8OCB 10% HMWS | (H) T$_g$→ <−40 C. →SmA→ 67.0(−4.6)→I |
| MM22199-41D DCHB Form 4 | 50% DCHB Additive 4 40% Si$_2$8OCB 10% HMWS | (H) T$_g$→ <−40 C. →SmA→ 67.1(−4.0)→I |

TABLE 3

Low Birefringence Nematic Preformulations (component (c))

| Formulation Reference | Composition (wt %) | DSC Data (10 C./min cooling) Trans Temp (Enthalpy J/g) |
|---|---|---|
| MM22066-79C | 46.9% 3-PCH 42.0% 5-PCH 11.1% 5-CCB | ((H) Cr→ <−40 C. →N→ 66.7(−4.0)*→I |
| | DCLB Additive 1 | |
| MM22066-152C | 44.9% 3-PCH 38.0% 5-PCH 17.1% 5-CCB | (H) Cr→ <−40 C. →N→ 75.8(−3.1)*→I |
| | DCLB Additive 2 | |
| MM22066-152D | 42.9% 3-PCH 34.0% 5-PCH 23.1% 5-CCB | (H) Cr→ <−40 C. →N→ 87.0(−3.0)*→I |
| | DCLB Additive 3 | |
| MM22199-113A | 40.9% 3-PCH 30.0% 5-PCH 29.1% 5-CCB | (H) Cr→ <−40 C. →N→ 95.3(−3.7)*→I |
| | DCLB Additive 4 | |
| MM22199-113B | 38.9% 3-PCH 26.0% 5-PCH 35.1% 5-CCB | (H) Cr→ <−40 C. →N→ 97.9(−3.4)*→I |
| | DCLB Additive 5 | |

TABLE 4

Low Birefringence Formulations

| Formulation Reference | Composition (wt %) | DSC Data (10 C./min cooling) Trans Temp (Enthalpy J/g) | TOA/EOA Data |
|---|---|---|---|
| MM22066-130D DCLB Form 1 | 50% DCLB Additive 1 40% Si$_2$8OCB 10% HMWS | (H) T$_g$→ <−40 →SmA→38.8(−1.3)→ N→41.8(−2.8)→I | (H) T$_g$→ <−40 C. →SmA→36.8 C.→SmA + N→37.2 C.→N→ 40.5 C.→N + I→48.8 C.→I |
| MM22066-142D DCLB Form 1 | 50% DCLB Additive 1 40% Si$_2$8OCB 10% HMWS | (H) T$_g$→ <−40 C. →SmA→41.5(−7.3)*→I | Not examined |
| MM22199-42A DCLB Form 2 | 50% DCLB Additive 2 40% Si$_2$8OCB 10% HMWS | (H) T$_g$→ <−40 C. →SmA→44.1(−1.4)→ N→46.8(−2.7)→I | (H) T$_g$→ <−40 C. →SmA→42.9 C.→SmA + N→44.0 C.→N→ 45.7C→N + I→54.7 C.→I |
| MM22199-42B DCLB Form 3 | 50% DCLB Additive 3 40% Si$_2$8OCB 10% HMWS | (H) T$_g$→ <−40 C. →SmA→49.4(−1.9)→ N→51.8(−2.7)→I | (H) T$_g$→ <−40 C. →SmA→48.7 C.→SmA + N→49.8 C.→N→ 51.3 C.→N + I→63.1 C.→I |
| MM22199-42C DCLB Form 4 | 20% DCLB Additive 3 64% Si$_2$8OCB 16% HMWS | (H) T$_g$→ <−40 C. →SmA→58.9(−7.6)→I | (H) T$_g$→ <−40 C.→SmA→56.8 C.→SmA + I→62.2 C.→I |
| MM22199-42D DCLB Form 5 | 30% DCLB Additive 3 56% Si$_2$8OCB 14% HMWS | (H) T$_g$→ <−40 C. →SmA→55.3(−6.4) →I | (H) T$_g$→<−40 C. →SmA→53.3 C.→SmA + I→60.0 C.→I |
| MM22268-30A DCLB Form 5 | 30% DCLB Additive 3 56% Si$_2$8OCB 14% HMWS | (H) T$_g$→ <−40 C. →SmA→55.6(−7.7)→I | Not examined |
| MM22199-42E DCLB Form 6 | 40% DCLB Additive 3 48% Si$_2$8OCB 12% HMWS | (H) T$_g$→ <−40 C. →SmA→51.6(−5.1)→I | (H) T$_g$→ <−40 C. →SmA→49.5 C.→SmA + I→58.2 C.→I |
| MM22199-113D DCLB Form 6 + HTAP | 40% DCLB Additive 3 48% Si$_2$8OCB 12% HMWS 0.04% HTAP | (H) T$_g$→ <−40 C. →SmA→50.9(−5.8)→I | |
| MM22199-71A DCLB Form 7 | 50% MDA-00-4009 40% Si$_2$8OCB 10% HMWS | (H) T$_g$→ <−40 C. →SmA/N→55.4(−2.1)→I | (H) T$_g$→ <−40 C. →SmA→49.6 C.→SmA + N→52.7 C.→ N + I→76.6→I |
| MM22268-30B DCLB Form 8 | 30% MDA-00-4009 56% Si$_2$8OCB 14% HMWS | (H) T$_g$→ ? C. →SmA→58.3(−4.1) →I | (H) T$_g$→ <−40 C. →SmA→51.4 C.→SmA + I→69.8 C.→I |

TABLE 5
| Abbreviations | |
|---|---|
| Code | Structure |
| 2CB | 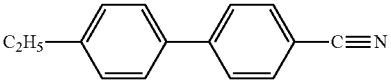<br>4-ethyl-4'-cyanobiphenyl |
| 3-OCB | 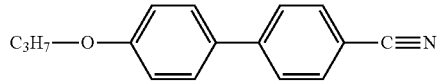<br>4-Propoxy-4'-cyanobiphenyl |
| 5CB | 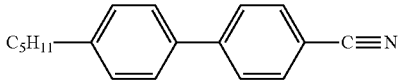<br>4-pentyl-4'-cyanobiphenyl |
| 5-CCB | <br>trans-4-(4-Pentyl)cyclohexyl-4'-cyanobiphenyl |
| 5CT | <br>4-cyano-4'-pentylterphenyl |
| 3-PCH | 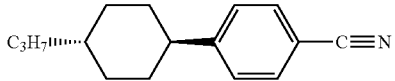<br>4-(trans-4'-n-Propylcyclohexyl)benzonitrile |
| 5-PCH | 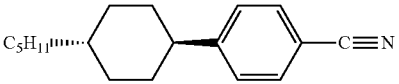<br>4-(trans-4'-n-Pentylcyclohexyl)benzonitrile |

TABLE 5-continued

| | Abbreviations |
|---|---|
| Code | Structure |

BL003 — Commercial formulation (Merck)

Si2-8OCB $$Me_3SiOSiMe_2-(CH_2)_8-O-\text{[biphenyl]}-CN$$

HMWS
For examples given herein, n has an average value of 10 and m = 4

$$Me_3SiO-\underset{\underset{(CH_2)_m}{|}}{\underset{|}{Si}}(Me)(O)_n-SiMe_3$$
with $(CH_2)_m-O-\text{[biphenyl]}-CN$ CTAB — CetylTrimethylAmmoniumBromide
CTAP — CetylTrimethylAmmoniumPerchlorate
HTAP — HexadecylTrimethylAmmoniumPerchlorate

MG22222-7

(Me$_3$Si-O-SiMe$_2$-(CH$_2$)$_{11}$-N$^+$Et$_3$ ClO$_4^-$)

MG22222-81B $$Me-\underset{Me}{\underset{|}{Si}}(Me)-O-\left[\underset{Me}{\underset{|}{Si}}(Me)-O\right]_3-\left[\underset{(CH_2)_{11}}{\underset{|}{Si}}(Me)-O\right]_5-\underset{Me}{\underset{|}{Si}}(Me)-Me$$

with $Et_3N^+$ $ClO_4^-$

The invention claimed is:

1. A thermotropic liquid crystal smectic A composition exhibiting a smectic type A phase made up of multiple layers and capable of forming a liquid crystal optical device when sandwiched between a pair of electrodes, wherein:

under the influence of different electric fields applied between the electrodes, the alignment of the layers of the composition can become more ordered or more disordered, and the composition has stable states in which the alignment of the layers of the composition are differently ordered including an ordered state, a disordered state, and intermediate states, the composition being such that, once switched to a given state by an electric field, it remains substantially in that state when the field is removed, which composition comprises, in weight %:

(a) 25-75% in total of at least one siloxane of the general formula I:

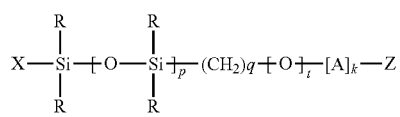

(I)

wherein
p=1 to 10,
q=1 to 12,
t=0 or 1,
k=2 or 3,
A is a phenyl or cyclohexyl ring which may be the same or different and are bonded together in para positions,
R=a $C_{1-3}$ alkyl group, which may be the same or different,
X=a $C_{1-12}$ alkyl group, and
Z=F, Cl, Br, I, CN, $NH_2$, $NO_2$, $NMe_2$, NCS, $CH_3$, or $OCH_3$, $CF_3$, $OCF_3$, $CH_2F$, $CHF_2$;

(b) 0.001-1% in total of at least one quaternary ammonium ionisable species of the general formula II:

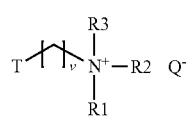

(II)

wherein:
T=a methyl group or a silyl or siloxane group, and
v=1 to 30,
R1, R2, and R3, which may be the same or different, are $C_{1-4}$ alkyl,
$Q^-$ is an oxidatively stable ion, (c) 20-65% in total of at least one polarisable linear molecule having an alkyl chain, the molecule having the general formula III:

D-A'$_k$-Y          (III)

wherein:

D stands for a $C_{1-16}$ straight chained alkyl or alkoxy group, optionally containing one or more double bonds;

k=2 or 3,

A' is a phenyl, cyclohexyl, pyrimidine, 1,3-dioxane, or 1,4- bicyclo[2,2,2]octyl ring, wherein each A' may be the same or different and are bonded together in para positions, the terminal ring attached to Y optionally being a phenyl, and Y is located in the para position of the terminal ring of the group A'$_k$ and is selected from Z (as defined above in connection with Formula I), $C_{1-16}$ straight chained alkyl, $C_{1-16}$ straight chained alkoxy, $OCHF_2$, $NMe_2$, $CH_3$, OCOCH3, and $COCH_3$; and (d) 2-20% in total of at least one side chain liquid crystal polysiloxane of the general formula IV:

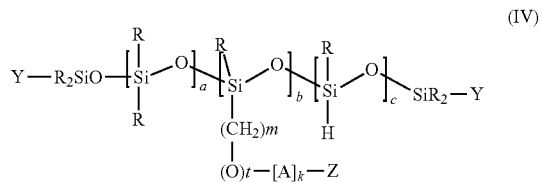

(IV)

wherein:

a, b, and c each independently have a value of 0 to 100 and are such that a+b+c has an average value in the range 3 to 200, and a is such that the chain units of the formula Y—$R_2$SiO—[$SiR_2$—O]$_a$ represents 0 to 25 mole percentage of the compound of the general formula IV, and c is such that the units of the formula chain —[SiHR—O]$_c$—$R_2$SiO—Y represents 0 to 15 mole percentage of the compound of the general formula IV, m=3 to 20 t=0 or 1, k=2 or 3,

A is a phenyl or cyclohexyl ring which may be the same or different and the rings are bonded together in para positions, R=a $C_{1-3}$ alkyl group each of which may be the same or different, and Y=a $C_{1-12}$ alkyl group, a chromophore, or a calamitic liquid crystal group and each of which may be the same or different, and Z is as defined above in connection with Formula I, and wherein the amounts and nature of the components are selected such that the composition possesses smectic A layering and siloxane-rich sub-layering, as detected by X-ray diffraction.

2. A thermotropic liquid crystal smectic A composition as claimed in claim 1, wherein the siloxane (a) is a compound of the formula Ia:

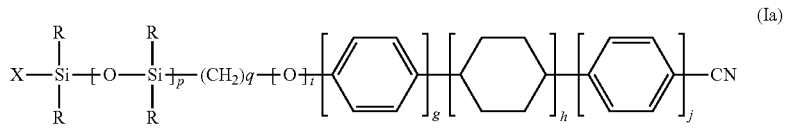

where X, R, p, q, and t are defined above in connection with Formula I, and g and h each independently stand for 0, 1 or 2, and j stands for 1, 2, or 3, subject to the requirement that g+h+j is 2 or 3.

3. A thermotropic liquid crystal smectic A composition as claimed in claim 1, wherein the side chain siloxane liquid crystal, component (d), which may be a polymer, copolymer, or terpolymer, is a compound of the general formula IVa

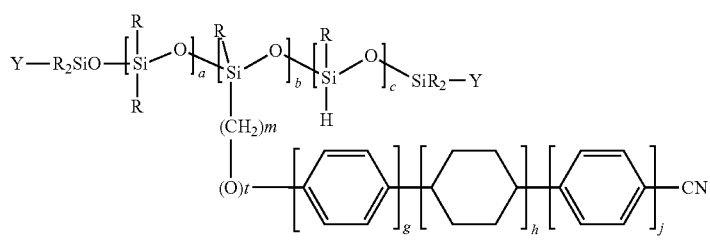

where a, b, c, m, and t are as defined in connection with Formula IV, g =0, 1, or 2, h=0, 1 or 2, j=1, 2, or 3, subject to the requirement that g+h+j is 2 or 3; each R may be the same or different and is an alkyl group, and Y=a $C_{1-8}$ alkyl group, a chromophore, or a calamitic liquid crystal group.

4. A thermotropic liquid crystal smectic A composition as claimed in claim 1, wherein the ionisable species (b) of formula II is a compound of the formula (IIa):

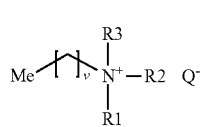

where v, R1, R2, R3, and Q are as defined in claim 1 in connection with Formula II.

5. A thermotropic liquid crystal smectic A composition as claimed in claim 1, wherein the ionisable species (b) of formula II is a compound of the formula IIb:

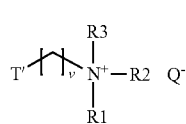

wherein v, R1, R2, R3, and Q are as defined in claim 1 in connection with Formula II and T' is a silyl or siloxane group.

6. A thermotropic liquid crystal smectic A composition as claimed in claim 1, wherein the molecule having the general formula (III) in component (c) comprises an organic calamitic mesogen which exhibits either a nematic or a Smectic A liquid crystal phase.

7. A thermotropic liquid crystal smectic A composition as claimed in claim 1, wherein the at least one polarisable linear molecule, component (c), includes a compound of the formula IIIa and/or a compound of the formula IIIb.

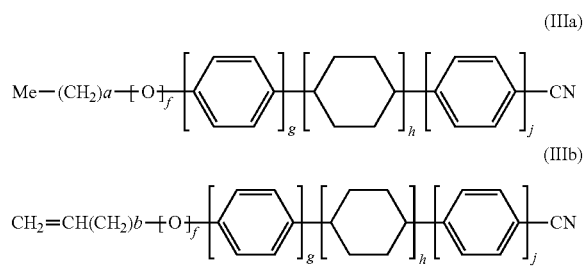

where a=1 to 15 and b=1 to 13; f=0 or 1, j=1,2, or 3; g=0,1, or 2, and h=0,1, or 2, subject to the requirement that g+h+j does not exceed 3.

8. A thermotropic liquid crystal smectic A composition as claimed in claim 1, which further includes:
(e) up to 10% by weight in total of at least one positive or negative dichroic dye, optionally a cyan, yellow, magenta, red, green or blue dye or an emissive dye, the dye being aligned with neighbouring mesogenic components of the composition.

9. A thermotropic liquid crystal smectic A composition as claimed in claim 1, which further includes:
(f) up to 10% by weight of one or more viscosity-reducing solvents or diluents.

10. A thermotropic liquid crystal smectic A composition as claimed in claim 1, which further includes:
(g) up to 10 wt % of at least one molecule that is not a liquid crystal, but which can be incorporated into the formulation, without degrading the smectic A layer quality of the composition.

11. A thermotropic liquid crystal smectic A composition as claimed in claim 10, wherein the at least one molecule that is not a liquid crystal comprises a compound of the formula (V):

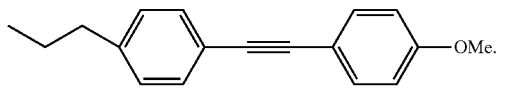
(V)

12. A thermotropic liquid crystal smectic A composition as claimed in claim 1, which also further includes:

(h) up to 50% by weight in total of at least one birefringence-altering additive selected from:

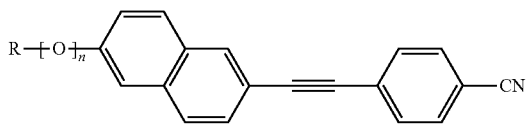

where R=$C_{1-10}$alkyl, n=0, or 1,

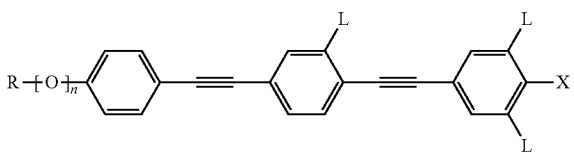

where R=$C_{1-10}$alkyl, n=0, or 1, L is selected from hydrogen or $C_{1-3}$ alkyl, and X=CN, F, NCS, $CF_3$, $OCF_3$ or $C_{1-6}$ alkyl, or

where R is a $C_{1-10}$ alkyl group,

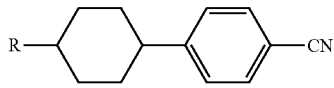

where R=a $C_{1-10}$ alkyl group
or

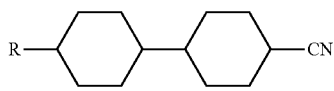

where R=a $C_{1-10}$ alkyl group, or

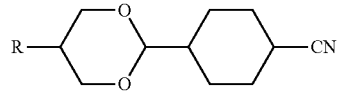

where R=a $C_{1-10}$ alkyl group.

13. A thermotropic liquid crystal smectic A composition as claimed in claim 12, wherein the total amount of the birefringence-altering additive component (h) and the total amount of component (c) is in the range of 35-73 wt %.

14. A thermotropic liquid crystal smectic A composition as claimed in claim 1, which has a birefringence in the range 0.15 to 0.3 at 20° C. and 589 nm and is opaque in the disordered state and clear in the ordered state.

15. A thermotropic liquid crystal smectic A composition as claimed in claim 14, which further includes up to 10% by weight in total of at least one positive or negative dichroic dye, optionally a cyan, yellow, magenta, red, green or blue or a black dye, or an emissive dye, the dye being aligned with neighbouring mesogenic components of the composition.

16. A thermotropic liquid crystal smectic A composition as claimed in claim 1, which (i) has a birefringence in the range 0.07 to 0.15 at 20° C. and 589 nm, (ii) is translucent in the disordered state and clear in the ordered state, and (iii) includes up to 10% by weight in total of at least one positive or negative dichroic dye, optionally a cyan, yellow, magenta, red, green or blue dye, or a black dye or an emissive dye, the dye being aligned with neighbouring mesogenic components of the composition.

17. A cell comprising a pair of opposed spaced-apart electrodes at least one of which is light transmitting, and a thermotropic liquid crystal smectic A composition as claimed in claim 1 located between the electrodes.

18. A cell as claimed in claim 17, which forms a single optical element or multiple pixelated optical elements.

19. A cell as claimed in claim 17, which forms multiple pixelated optical elements that are individually addressable thereby allowing the cell to display information, which may be graphic or in the form of data characters.

20. A cell as claimed in claim 17, wherein the spacing between the electrodes is in the range of 2-50 microns.

21. A cell as claimed in claim 17, that has a front and a back, wherein
the pair of electrodes includes (a) a light-transmitting electrode located at the front through which the thermotropic liquid crystal smectic A composition of the cell can be observed by a user and (b) a rear electrode located at the back.

22. A cell as claimed in claim 21, wherein the rear electrode is reflective and reflects radiation incident on its back through the cell.

23. A cell as claimed in claim 21, wherein the rear electrode is transparent and the rear of the cell includes a surface that can transmit light through the cell, or the surface is light emissive, the reflective or emissive surface optionally being coloured and/or bearing information.

24. A cell as claimed in claim 17, wherein each of the electrodes is supported on a substrate, which may be rigid or flexible.

25. An optical device comprising at least one cell as claim 17.

26. An optical device as claimed in claim 25, that includes multiple pixelated optical elements that are addressed individually.

27. An optical device as claimed in claim 25, which comprises a stack composed of two or more cells stacked on top of each other, and wherein the thermotropic liquid crystal smectic A composition in each cell (i) contains up to 10% by weight in total of at least one positive or negative dichroic dye, optionally a cyan, yellow, magenta, red, green or blue dye, or a black dye or an emissive dye the dye being aligned with neighbouring mesogenic components of the composition and (ii) is selected to exhibit a low birefringence in the range of 0.08 to 0.15, at 20° C. and 589 nm.

28. A method of switching a cell containing a thermotropic liquid crystal smectic A composition as claimed in claim 1 sandwiched between a pair of electrodes, the switching being from one state to a more ordered state, which comprises applying an alternating electric field between the electrodes having a frequency of at least 1000 Hz.

29. A method of switching a cell containing a thermotropic liquid crystal smectic A composition as claimed in claim 1 sandwiched between a pair of electrodes, the switching being from one state to a more disordered state, which method comprises applying an alternating electric field having a frequency of less than 500 Hz or a non-alternating electric field between the electrodes.

30. A thermotropic liquid crystal composition capable of forming a liquid crystal display when sandwiched between a pair of electrodes, the composition comprising
a composition exhibiting a smectic type A phase; and
a dopant in the form of a quaternary ammonium ionisable species of the general formula VI:

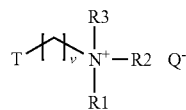

(VI)

wherein:
v=1 to 30,
R1, R2, and R3 are $C_{1-4}$ alkyl, which may be the same or different,
T=a silyl or siloxane group, and
$Q^-$ is a $ClO_4^-$ ion.

31. A cell, which may form a single optical element or multiple pixelated optical elements, comprising a pair of opposed spaced-apart electrodes at least one of which is light transmitting, and a thermotropic liquid crystal composition as claimed in claim 30 located between the electrodes.

32. An optical device comprising at least one cell as claimed in claim 31.

* * * * *